US012430990B2

(12) United States Patent
Sorreta et al.

(10) Patent No.: US 12,430,990 B2
(45) **Date of Patent: *Sep. 30, 2025**

(54) GAMING SYSTEM AND METHOD PROVIDING A CLASS II BINGO GAME WITH A PLAYER-SELECTABLE WILD SPOT FEATURE

(71) Applicant: IGT, Las Vegas, NV (US)

(72) Inventors: Gianpaulo Sorreta, Sparks, NV (US); Bradford Brown, Sparks, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,162

(22) Filed: May 24, 2023

(65) Prior Publication Data

US 2023/0326295 A1 Oct. 12, 2023

Related U.S. Application Data

(63) Continuation of application No. 17/493,463, filed on Oct. 4, 2021, now Pat. No. 11,704,972, which is a continuation of application No. 15/273,012, filed on Sep. 22, 2016, now Pat. No. 11,164,423.

(51) Int. Cl.
*G07F 17/32* (2006.01)

(52) U.S. Cl.
CPC ........ *G07F 17/326* (2013.01); *G07F 17/3272* (2013.01); *G07F 17/329* (2013.01); *G07F 17/3293* (2013.01)

(58) Field of Classification Search
CPC .. G07F 17/326; G07F 17/329; G07F 17/3272; G07F 17/3293
See application file for complete search history.

(56) References Cited

U.S. PATENT DOCUMENTS 5,100,137 A 3/1992 Fulton
5,167,413 A 12/1992 Fulton
5,251,897 A 10/1993 Fulton
5,322,295 A 6/1994 Cabot et al.
5,374,067 A 12/1994 Jones
5,411,257 A 5/1995 Fulton
5,431,408 A 7/1995 Adams
5,437,451 A 8/1995 Fulton
5,531,448 A 7/1996 Moody
5,636,842 A 6/1997 Cabot et al.
5,732,950 A 3/1998 Moody
5,755,621 A 5/1998 Marks et al.
5,803,809 A 9/1998 Yoseloff
5,816,915 A 10/1998 Kadlic
5,820,460 A 10/1998 Fulton
5,823,873 A 10/1998 Moody
(Continued)

*Primary Examiner* — Carl V Larsen
(74) *Attorney, Agent, or Firm* — Neal, Gerber & Eisenberg LLP

(57) ABSTRACT

The gaming system and method of the present disclosure provide a Class II bingo game with a player-selectable wild spot feature. Generally, for a play of the Class II bingo game and for each player, the gaming system provides that player a bingo card and enables the player to affirmatively designate up to a designated quantity of spots of the bingo card as wild spots. The wild spots are guaranteed marks. The gaming system then draws bingo numbers until a game-winning pattern is marked on one of the players' bingo cards.

16 Claims, 15 Drawing Sheets

(56) References Cited

U.S. PATENT DOCUMENTS

| | | | |
|---|---|---|---|
| 5,833,536 | A | 11/1998 | Davids et al. |
| 5,882,259 | A | 3/1999 | Holmes, Jr. et al. |
| 5,882,260 | A | 3/1999 | Marks |
| 5,911,418 | A | 6/1999 | Adams |
| 5,954,335 | A | 9/1999 | Moody |
| 5,957,774 | A | 9/1999 | Holmes, Jr. et al. |
| 6,007,066 | A | 12/1999 | Moody |
| 6,050,658 | A | 4/2000 | O'Sullivan et al. |
| 6,062,979 | A | 5/2000 | Inoue |
| 6,098,985 | A | 8/2000 | Moody |
| 6,120,031 | A | 9/2000 | Adams |
| 6,174,235 | B1 | 1/2001 | Walker et al. |
| 6,176,781 | B1 | 1/2001 | Walker et al. |
| 6,193,235 | B1 | 2/2001 | Vancura et al. |
| 6,196,547 | B1 | 3/2001 | Pascal et al. |
| 6,248,016 | B1 | 6/2001 | Walker et al. |
| 6,257,979 | B1 | 7/2001 | Walker et al. |
| 6,309,300 | B1 | 10/2001 | Glavich |
| 6,311,978 | B1 | 11/2001 | Moody |
| 6,315,291 | B1 | 11/2001 | Moody |
| 6,315,664 | B1 | 11/2001 | Baerlocher et al. |
| 6,319,124 | B1 | 11/2001 | Baerlocher et al. |
| 6,322,078 | B1 | 11/2001 | Adams |
| 6,334,613 | B1 | 1/2002 | Yoseloff |
| 6,364,313 | B1 | 4/2002 | Moody |
| 6,364,767 | B1 | 4/2002 | Brossard et al. |
| 6,398,645 | B1 | 6/2002 | Yoseloff |
| 6,419,578 | B1 | 7/2002 | Moody et al. |
| 6,422,940 | B1 | 7/2002 | Walker et al. |
| 6,439,995 | B1 | 8/2002 | Hughs-Baird et al. |
| 6,450,883 | B1 | 9/2002 | O'Halloran |
| 6,474,645 | B2 | 11/2002 | Tarantino |
| 6,494,454 | B2 | 12/2002 | Adams |
| 6,511,375 | B1 | 1/2003 | Kaminkow |
| 6,514,141 | B1 | 2/2003 | Kaminkow et al. |
| 6,517,074 | B1 | 2/2003 | Moody et al. |
| 6,523,829 | B1 | 2/2003 | Walker et al. |
| 6,561,898 | B2 | 5/2003 | Moody |
| 6,561,899 | B2 | 5/2003 | Vancura |
| 6,568,680 | B1 | 5/2003 | Moody et al. |
| 6,582,307 | B2 | 6/2003 | Webb |
| 6,599,185 | B1 | 7/2003 | Kaminkow et al. |
| 6,602,137 | B2 | 8/2003 | Kaminkow et al. |
| 6,604,740 | B1 | 8/2003 | Singer et al. |
| 6,609,971 | B2 | 8/2003 | Vancura |
| 6,652,377 | B1 | 11/2003 | Moody |
| 6,672,959 | B2 | 1/2004 | Moody et al. |
| 6,676,516 | B2 | 1/2004 | Baerlocher et al. |
| 6,726,427 | B2 | 4/2004 | Jarvis et al. |
| 6,729,961 | B1 | 5/2004 | Millerschone |
| 6,733,386 | B2 | 5/2004 | Cuddy et al. |
| 6,769,983 | B2 | 8/2004 | Slomiany |
| 6,780,107 | B2 | 8/2004 | Baerlocher et al. |
| 6,780,109 | B2 | 8/2004 | Kaminkow |
| 6,783,457 | B2 | 8/2004 | Hughs-Baird et al. |
| 6,805,349 | B2 | 10/2004 | Baerlocher et al. |
| 6,840,858 | B2 | 1/2005 | Adams |
| 6,866,583 | B2 | 3/2005 | Glavich et al. |
| 6,875,108 | B1 | 4/2005 | Hughs-Baird |
| 6,877,745 | B1 | 4/2005 | Walker et al. |
| 6,899,620 | B2 | 5/2005 | Kaminkow et al. |
| 6,905,406 | B2 | 6/2005 | Kaminkow et al. |
| 6,916,245 | B1 | 7/2005 | Vancura et al. |
| 6,918,834 | B2 | 7/2005 | Vancura |
| 6,921,335 | B2 | 7/2005 | Rodgers et al. |
| 6,932,701 | B2 | 8/2005 | Glavich et al. |
| 6,935,950 | B2 | 8/2005 | Tarantino |
| 6,955,356 | B2 | 10/2005 | Moody |
| 6,958,013 | B2 | 10/2005 | Miereau et al. |
| 6,964,418 | B2 | 11/2005 | Moody |
| 6,991,538 | B2 | 1/2006 | Cannon |
| 6,994,624 | B2 | 2/2006 | Gold et al. |
| 7,004,834 | B2 | 2/2006 | Walker et al. |
| 7,037,191 | B2 | 5/2006 | Rodgers et al. |
| 7,040,984 | B2 | 5/2006 | Mead |
| 7,056,207 | B2 | 6/2006 | Walker et al. |
| 7,059,965 | B2 | 6/2006 | Jackson |
| 7,070,502 | B1 | 7/2006 | Bussick et al. |
| 7,074,127 | B2 | 7/2006 | Cuddy et al. |
| 7,090,580 | B2 | 8/2006 | Rodgers et al. |
| 7,094,148 | B2 | 8/2006 | Baerlocher et al. |
| 7,121,942 | B2 | 10/2006 | Baerlocher |
| 7,137,179 | B2 | 11/2006 | Yokouchi et al. |
| 7,137,628 | B2 | 11/2006 | Moody |
| 7,156,397 | B2 | 1/2007 | Moody et al. |
| 7,156,734 | B1 | 1/2007 | Walker et al. |
| 7,169,042 | B2 | 1/2007 | Muir et al. |
| 7,172,506 | B2 | 2/2007 | Baerlocher et al. |
| 7,201,655 | B2 | 4/2007 | Walker et al. |
| 7,235,011 | B2 | 6/2007 | Randall et al. |
| 7,247,092 | B2 | 7/2007 | Jarvis et al. |
| 7,264,545 | B2 | 9/2007 | Maya et al. |
| 7,273,415 | B2 | 9/2007 | Cregan et al. |
| 7,297,057 | B2 | 11/2007 | Gerrard et al. |
| 7,300,348 | B2 | 11/2007 | Kaminkow et al. |
| 7,306,519 | B2 | 12/2007 | Baerlocher |
| 7,314,409 | B2 | 1/2008 | Maya et al. |
| 7,316,609 | B2 | 1/2008 | Dunn et al. |
| 7,354,344 | B2 | 4/2008 | Paulsen et al. |
| 7,371,174 | B2 | 5/2008 | Baerlocher |
| 7,377,849 | B2 | 5/2008 | Baerlocher |
| 7,396,279 | B2 | 7/2008 | Berman et al. |
| 7,399,227 | B2 | 7/2008 | Michaelson et al. |
| 7,413,510 | B2 | 8/2008 | Schlegel et al. |
| 7,416,189 | B2 | 8/2008 | Wilde et al. |
| 7,419,162 | B2 | 9/2008 | Lancaster et al. |
| 7,442,123 | B2 | 10/2008 | Brill et al. |
| 7,470,186 | B2 | 12/2008 | Cannon |
| 7,488,251 | B2 | 2/2009 | Kaminkow |
| 7,513,826 | B2 | 4/2009 | Cuddy |
| 7,544,129 | B2 | 6/2009 | Baerlocher |
| 7,547,252 | B2 | 6/2009 | Peterson et al. |
| 7,553,230 | B2 | 6/2009 | Cannon |
| 7,553,231 | B2 | 6/2009 | Rodgers et al. |
| 7,566,271 | B2 | 7/2009 | Hostetler et al. |
| 7,585,218 | B2 | 9/2009 | Mead et al. |
| 7,591,722 | B2 | 9/2009 | Baerlocher et al. |
| 7,591,723 | B2 | 9/2009 | Cregan et al. |
| 7,614,946 | B2 | 11/2009 | Nicely |
| 7,641,197 | B2 | 1/2010 | Jackson |
| 7,658,672 | B1 | 2/2010 | Wolf et al. |
| 7,690,981 | B2 | 4/2010 | Ching et al. |
| 7,749,059 | B2 | 7/2010 | Tarantino |
| 7,749,063 | B2 | 7/2010 | Belger et al. |
| 7,749,070 | B2 | 7/2010 | Baerlocher et al. |
| 7,753,774 | B2 | 7/2010 | Gail et al. |
| 7,771,274 | B2 | 8/2010 | Walker et al. |
| 7,775,875 | B2 | 8/2010 | Nguyen et al. |
| 7,785,188 | B2 | 8/2010 | Cannon |
| 7,803,041 | B2 | 9/2010 | Gold et al. |
| 7,806,760 | B2 | 10/2010 | Baerlocher |
| 7,815,500 | B2 | 10/2010 | Montross et al. |
| 7,837,545 | B2 | 11/2010 | Blair, Jr. et al. |
| 7,857,693 | B1 | 12/2010 | Johnson et al. |
| 7,867,073 | B2 | 1/2011 | Walker et al. |
| 7,867,074 | B2 | 1/2011 | Gerrard et al. |
| 7,901,282 | B2 | 3/2011 | Cannon |
| 7,914,369 | B2 | 3/2011 | Walker et al. |
| 7,914,373 | B2 | 3/2011 | Webb et al. |
| 7,918,724 | B2 | 4/2011 | Walker et al. |
| 7,955,170 | B2 | 6/2011 | Gail et al. |
| 7,980,943 | B2 | 7/2011 | McGlone et al. |
| 7,993,191 | B2 | 8/2011 | Evans et al. |
| 8,002,625 | B2 | 8/2011 | Maya |
| 8,025,561 | B2 | 9/2011 | Reddicks et al. |
| 8,029,355 | B2 | 10/2011 | Parente |
| 8,043,153 | B2 | 10/2011 | Ross et al. |
| 8,043,155 | B2 | 10/2011 | Singer et al. |
| 8,057,292 | B2 | 11/2011 | Gail |
| 8,062,119 | B2 | 11/2011 | Stern et al. |
| 8,070,587 | B2 | 12/2011 | Davis et al. |
| 8,079,903 | B2 | 12/2011 | Nicely et al. |
| 8,083,578 | B2 | 12/2011 | Jackson |
| 8,092,290 | B2 | 1/2012 | Darby |

(56) References Cited

U.S. PATENT DOCUMENTS 8,105,151 B2 1/2012 Caputo et al.
8,113,939 B2 2/2012 Cannon
8,118,662 B2 2/2012 Caputo et al.
8,123,604 B2 2/2012 Lancaster et al.
8,123,606 B2 2/2012 Hollibaugh et al.
8,123,607 B2 2/2012 Van Asdale
8,128,478 B2 3/2012 Meyer
8,133,105 B2 3/2012 Walker et al.
8,133,113 B2 3/2012 Nguyen et al.
8,137,174 B2 3/2012 Nicely et al.
8,177,616 B2 5/2012 Nicely
8,197,319 B2 6/2012 Nicely
8,197,326 B2 6/2012 Chamberlain et al.
8,201,827 B2 6/2012 Weingardt
8,216,039 B2 7/2012 Nicely et al.
8,221,206 B2 7/2012 Marks et al.
8,226,469 B2 7/2012 Pawloski et al.
8,231,454 B2 7/2012 Caputo
8,235,780 B2 8/2012 Nicely
8,262,451 B2 9/2012 Powell et al.
8,262,455 B2 9/2012 Caputo et al.
8,287,364 B2 10/2012 Caputo et al.
8,353,751 B2 1/2013 Bickley et al.
8,398,472 B2 3/2013 Bansemer et al.
8,398,473 B2 3/2013 Baerlocher et al.
8,408,984 B2 4/2013 Walker et al.
8,434,764 B2 5/2013 Walker et al.
8,444,465 B2 5/2013 Macaulay
8,444,471 B2 5/2013 Reddicks et al.
8,449,362 B2 5/2013 Jackson
8,449,363 B2 5/2013 Baerlocher et al.
8,460,090 B1 6/2013 Gilliland
8,475,253 B1 7/2013 Cole
8,475,257 B2 7/2013 Bienvenue et al.
8,500,538 B2 8/2013 Warner et al.
8,562,415 B2 10/2013 Gail et al.
8,579,709 B2 11/2013 Saffari et al.
8,602,864 B1 12/2013 Lewis
8,616,952 B1 12/2013 Mullins
8,668,571 B2 3/2014 Hedrick et al.
8,672,762 B1 3/2014 Basallo et al.
8,708,804 B2 4/2014 Caputo et al.
8,740,687 B1 6/2014 Brown et al.
8,753,188 B2 6/2014 Cannon
8,764,540 B2 7/2014 Hollibaugh
8,764,544 B2 7/2014 Daniels
8,770,585 B2 7/2014 Vancura et al.
8,814,651 B1 8/2014 Humphrey et al.
8,814,652 B2 * 8/2014 Harkins .................. G07F 17/32 463/19
8,821,248 B2 9/2014 Warner et al.
8,974,285 B2 3/2015 Roper et al.
9,005,005 B2 4/2015 Powell et al.
9,039,509 B2 5/2015 Mullins
9,098,847 B2 8/2015 Basallo et al.
9,293,014 B2 3/2016 Wotton et al.
9,317,990 B2 4/2016 Gail
9,384,636 B2 7/2016 Cannon
9,449,467 B2 9/2016 Leupp et al.
9,449,468 B2 9/2016 Coleman et al.
9,728,046 B2 8/2017 Forman
11,164,423 B2 * 11/2021 Sorreta ................. G07F 17/326
11,704,972 B2 * 7/2023 Sorreta ................. G07F 17/329 463/19
2002/0113369 A1 * 8/2002 Weingardt ............ A63F 3/0645 273/269
2004/0204228 A1 * 10/2004 Walker ................ G07F 17/3244 463/20
2005/0054435 A1 3/2005 Rodgers et al.
2005/0059469 A1 * 3/2005 Gail ........................ G07F 17/32 463/19
2005/0101387 A1 5/2005 Wolf
2005/0119042 A1 6/2005 Chamberlain
2005/0148384 A1 7/2005 Marks et al.
2005/0221883 A1 10/2005 Lind
2005/0233798 A1 * 10/2005 Van Asdale ......... G07F 17/3286 463/19
2006/0025189 A1 2/2006 Hollibaugh
2006/0025198 A1 2/2006 Gail
2006/0025199 A1 2/2006 Harkins
2006/0030392 A1 2/2006 Rodgers et al.
2006/0030401 A1 2/2006 Mead et al.
2006/0035700 A1 * 2/2006 Van Asdale ............. G07F 17/32 463/19
2006/0046827 A1 3/2006 Saffari et al.
2006/0052148 A1 3/2006 Blair
2006/0121976 A1 6/2006 Odom
2006/0154714 A1 7/2006 Montross
2006/0229123 A1 10/2006 Owen
2006/0252481 A1 * 11/2006 Schmit ................ G07F 17/3293 463/13
2007/0060290 A1 3/2007 Watkins
2007/0123329 A1 * 5/2007 Frank .................... G07F 17/329 463/16
2007/0155472 A1 * 7/2007 Gail ........................ G07F 17/32 463/19
2007/0155473 A1 7/2007 Powell et al.
2008/0102952 A1 5/2008 Walker et al.
2008/0111309 A1 5/2008 Nicely et al.
2008/0254854 A1 * 10/2008 Slomiany ................ G07F 17/32 463/19
2009/0075714 A1 3/2009 Meyer et al.
2010/0022297 A1 1/2010 Saunders
2010/0099480 A1 4/2010 Caputo
2010/0120484 A1 5/2010 Caputo et al.
2011/0014963 A1 1/2011 Walker et al.
2011/0111818 A1 5/2011 Baerlocher
2011/0212759 A1 9/2011 Gail
2012/0108310 A1 5/2012 Hollibaugh
2012/0258782 A1 10/2012 Weingardt
2013/0053121 A1 2/2013 Weingardt
2013/0150142 A1 6/2013 Caputo
2013/0225268 A1 8/2013 Caputo et al.
2014/0066163 A1 3/2014 Mullins
2014/0287812 A1 9/2014 Friedman et al.
2015/0024834 A1 1/2015 Lewis
2015/0119128 A1 4/2015 Weingardt
2015/0141110 A1 5/2015 Gupta
2015/0141111 A1 5/2015 Gupta
2016/0035176 A1 * 2/2016 Forman ................. G07F 17/329 463/19
2017/0092072 A1 3/2017 Surmacz
2017/0301176 A1 10/2017 Forman

* cited by examiner

FIG. 2C

100a

Card 1

| | | | | | | | | | | | | |
|---|---|---|---|---|---|---|---|---|---|---|---|---|
| 37 | 50 | 26 | 52 | 30 | 19 | 13 | 12 | 23 | 4 | 9 | 17 | 28 |
| 42 | 8 | 48 | 11 | 1 | 45 | 21 | 40 | 49 | 46 | 51 | 39 | 47 |
| 14 | 33 | 43 | 25 | 32 | 18 | 29 | 6 | 2 | 24 | 7 | 31 | 35 |
| 5 | 3 | 44 | 27 | 20 | 10 | 41 | 34 | 36 | 22 | 16 | 38 | 15 |

100b

Card 2

| | | | | | | | | | | | | |
|---|---|---|---|---|---|---|---|---|---|---|---|---|
| 28 | 33 | 43 | 14 | 34 | 42 | 37 | 1 | 8 | 29 | 51 | 9 | 21 |
| 31 | 16 | 32 | 41 | 46 | 40 | 4 | 44 | 36 | 48 | 3 | 30 | 23 |
| 18 | 27 | 17 | 49 | 39 | 6 | 20 | 47 | 52 | 24 | 22 | 2 | 11 |
| 5 | 15 | 50 | 19 | 45 | 7 | 26 | 35 | 38 | 13 | 12 | 25 | 10 |

100c

Card 3

| | | | | | | | | | | | | |
|---|---|---|---|---|---|---|---|---|---|---|---|---|
| 46 | 40 | 48 | 13 | 17 | 2 | 15 | 18 | 52 | 30 | 47 | 8 | 7 |
| 36 | 28 | 9 | 1 | 14 | 16 | 10 | 21 | 44 | 45 | 42 | 43 | 27 |
| 41 | 22 | 31 | 23 | 37 | 26 | 6 | 38 | 3 | 39 | 34 | 32 | 5 |
| 50 | 35 | 49 | 25 | 51 | 19 | 33 | 29 | 4 | 12 | 20 | 24 | 11 |

100d

Card 4

| | | | | | | | | | | | | |
|---|---|---|---|---|---|---|---|---|---|---|---|---|
| 16 | 17 | 24 | 25 | 32 | 22 | 14 | 29 | 42 | 52 | 33 | 41 | 34 |
| 19 | 47 | 4 | 18 | 50 | 46 | 7 | 11 | 10 | 8 | 13 | 26 | 20 |
| 45 | 49 | 15 | 12 | 6 | 44 | 3 | 28 | 21 | 36 | 51 | 37 | 38 |
| 43 | 48 | 35 | 30 | 23 | 31 | 2 | 27 | 40 | 1 | 39 | 9 | 5 |

FIG. 2E

DRAWN BALLS: 51 31 14 16 5 39

100a
Card 1

| | | | | | | | | | | | | |
|---|---|---|---|---|---|---|---|---|---|---|---|---|
| 37 | 50 | 26 | 52 | 30 | 19 | 13 | 12 | 23 | 4 | 9 | 17 | 28 |
| 42 | 8 | 48 | 11 | 1 | 45 | 21 | 40 | 49 | 46 | 51 | 39 | 47 |
| 14 | 33 | 43 | 25 | 32 | 18 | 29 | 6 | 2 | 24 | 7 | 31 | 35 |
| 5 | 3 | 44 | 27 | 20 | 10 | 41 | 34 | 36 | 22 | 16 | 38 | 15 |

No Pattern Match!

100b
Card 2

| | | | | | | | | | | | | |
|---|---|---|---|---|---|---|---|---|---|---|---|---|
| 28 | 33 | 43 | 14 | 34 | 42 | 37 | 1 | 8 | 29 | 51 | 9 | 21 |
| 31 | 16 | 32 | 41 | 46 | 40 | 4 | 44 | 36 | 48 | 3 | 30 | 23 |
| 18 | 27 | 17 | 49 | 39 | 6 | 20 | 47 | 52 | 24 | 22 | 2 | 11 |
| 5 | 15 | 50 | 19 | 45 | 7 | 26 | 35 | 38 | 13 | 12 | 25 | 10 |

No Pattern Match!

100c
Card 3

| | | | | | | | | | | | | |
|---|---|---|---|---|---|---|---|---|---|---|---|---|
| 46 | 40 | 48 | 13 | 17 | 2 | 15 | 18 | 52 | 30 | 47 | 8 | 7 |
| 36 | 28 | 9 | 1 | 14 | 16 | 10 | 21 | 44 | 45 | 42 | 43 | 27 |
| 41 | 22 | 31 | 23 | 37 | 26 | 6 | 38 | 3 | 39 | 34 | 32 | 5 |
| 50 | 35 | 49 | 25 | 51 | 19 | 33 | 29 | 4 | 12 | 20 | 24 | 11 |

No Pattern Match!

100d
Card 4

| | | | | | | | | | | | | |
|---|---|---|---|---|---|---|---|---|---|---|---|---|
| 16 | 17 | 24 | 25 | 32 | 22 | 14 | 29 | 42 | 52 | 33 | 41 | 34 |
| 19 | 47 | 4 | 18 | 50 | 46 | 7 | 11 | 10 | 8 | 13 | 26 | 20 |
| 45 | 49 | 15 | 12 | 6 | 44 | 3 | 28 | 21 | 36 | 51 | 37 | 38 |
| 43 | 48 | 35 | 30 | 23 | 31 | 2 | 27 | 40 | 1 | 39 | 9 | 5 |

No Pattern Match!

FIG. 3C

500

| | | | | | | | | | | | | |
|---|---|---|---|---|---|---|---|---|---|---|---|---|
| 501 | 502 | 503 | 504 | 505 | 506 | 507 | 508 | 509 | 510 | 511 | 512 | 513 |
| 514 | 515 | 516 | 517 | 518 | 519 | 520 | 521 | 522 | 523 | 524 | 525 | 526 |
| 527 | 528 | 529 | 530 | 531 | 532 | 533 | 534 | 535 | 536 | 537 | 538 | 539 |
| 540 | 541 | 542 | 543 | 544 | 545 | 546 | 547 | 548 | 549 | 550 | 551 | 552 |

400

| | | | | | | | | | | | | |
|---|---|---|---|---|---|---|---|---|---|---|---|---|
| 401 | 402 | 403 | 404 | 405 | 406 | 407 | 408 | 409 | 410 | 411 | 412 | 413 |
| 414 | 415 | 416 | 417 | 418 | 419 | 420 | 421 | 422 | 423 | 424 | 425 | 426 |
| 427 | 428 | 429 | 430 | 431 | 432 | 433 | 434 | 435 | 436 | 437 | 438 | 439 |
| 440 | 441 | 442 | 443 | 444 | 445 | 446 | 447 | 448 | 449 | 450 | 451 | 452 |

300

| | | | | | | | | | | | | |
|---|---|---|---|---|---|---|---|---|---|---|---|---|
| 301 | 302 | 303 | 304 | 305 | 306 | 307 | 308 | 309 | 310 | 311 | 312 | 313 |
| 314 | 315 | 316 | 317 | 318 | 319 | 320 | 321 | 322 | 323 | 324 | 325 | 326 |
| 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 |

1000

GAMING SYSTEM AND METHOD PROVIDING A CLASS II BINGO GAME WITH A PLAYER-SELECTABLE WILD SPOT FEATURE

PRIORITY CLAIM

This application is a continuation of, claims the benefit of and priority to U.S. patent application Ser. No. 17/493,463, filed on Oct. 4, 2021, which is a continuation of, claims the benefit of and priority to U.S. patent application Ser. No. 15/273,012, filed on Sep. 22, 2016, the entire contents of which are each incorporated by reference herein.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the U.S. Patent and Trademark Office patent file or records, but otherwise reserves all copyright rights whatsoever.

BACKGROUND

Wager-based gaming in the United States is divided into Class I, Class II, and Class III games. Class I games include social games played for minimal prizes, or traditional ceremonial games. Class II games include bingo and bingo-like games (as well as central determination games). Class III games include any games that are not Class I or Class II games, such as games of chance typically offered in non-Indian, state-regulated casinos.

For a play of a traditional Class II bingo game, each player purchases one or more bingo cards that bear multiple bingo numbers of a set of a plurality of bingo numbers. The bingo numbers of the set are then sequentially drawn at random (e.g., selected via a random number generator). If a drawn bingo number matches a bingo number on a player's bingo card, that bingo number is marked on the player's bingo card. The draw continues until the marks on one of the player's bingo cards form a game-winning pattern (sometimes called a game-ending pattern). At that point, the play of the Class II bingo game ends, and the player whose marked bingo card forms the game-winning pattern is provided an award.

Some Class II bingo games also include one or more interim patterns. If the marks on a player's bingo card form an interim pattern, the player wins an interim award. Unlike a game-winning pattern match, an interim pattern match doesn't end the bingo number draw. Some Class II bingo games require an interim pattern to be marked within a particular quantity of bingo number draws (e.g., within the first five or ten bingo number draws). Class II bingo systems typically rank interim patterns from highest to lowest priority (e.g., highest to lowest associated interim award). If multiple interim patterns are marked on a single bingo card, the Class II bingo system usually provides the interim award for the highest priority marked interim pattern and ignores the other (lower priority) marked interim patterns.

Electronic gaming machines (EGMs) are very popular. Many EGMs provide Class III games, which in certain jurisdictions are subject to stricter approval and regulation than Class I and Class II games. Many gaming establishments have more EGMs that provide Class II bingo games than Class III games. Since many players enjoy Class III games more than Class II bingo games, it's often desirable for EGMs to provide Class II bingo games that have the look and feel of Class III games. Certain known Class II bingo systems do this by simulating the game play and the appearance of a traditional Class III game-such as a spinning-reel game or a video poker game-using a randomly determined Class II bingo game outcome.

To simulate the game play and appearance of a traditional Class III game using a Class II bingo game outcome, one known Class II bingo system associates each potential bingo card pattern-including the game-winning pattern, any interim patterns, and non-winning patterns—with an appropriate Class III game outcome (or multiple different Class III game outcomes). For instance, if the simulated Class III game is a spinning-reel game: (1) an L-shaped interim pattern associated with a 15 credit interim award is associated with a Class III game outcome of a 3×3 array of symbols including a BAR/BAR/BAR winning symbol combination; and (2) a non-winning pattern is associated with a Class III game outcome of a 3×3 array of symbols not including any winning symbol combinations.

For a play of the Class II bingo game, the Class II bingo system first determines a community award for the first player to mark the game-winning pattern on the player's bingo card. The Class II bingo system also determines whether any of the interim patterns were marked on any other bingo cards of any other players, and if so determines the corresponding interim awards for the respective players.

For each player, the Class II bingo system then simulates the game play and appearance of the Class III game by displaying the Class III game outcome (or one of the Class III game outcomes) associated with the marked pattern on that player's bingo card. For instance, continuing with the simulated Class III spinning-reel game example, if the L-shaped interim pattern is marked on a player's bingo card, the Class II bingo system displays reels spinning and stopping to reveal the associated Class III game outcome of the 3×3 array of symbols including the BAR/BAR/BAR winning symbol combination, and provides the associated 15 credit interim award.

Class II bingo gaming technology hasn't yet evolved to enable player interaction during game play to affect Class II game outcomes—the Class II game outcomes are entirely based on the random bingo number draw. This creates problems when using Class II bingo games to simulate the game play and appearance of certain Class III games that involve player interaction and use player interaction to affect the game outcomes.

For instance, Class II bingo systems can't accurately simulate the game play and appearance of a Class III five card draw poker game because it involves player interaction and uses the player interaction to affect the game outcome. For a typical a play of a Class III five card draw poker game, an EGM deals an initial hand of five cards face up from a 52-card deck of playing cards. The EGM enables the player to discard up to all five cards from the initial hand. The EGM replaces each discarded card with another card from the deck to form a final hand. After replacing any discarded cards, EGM evaluates the final hand for a winning card combination. The player interaction—here, the player's choice of which cards (if any) to discard—directly affects the final hand (i.e., the game outcome). Different hold/discard strategies will lead to different final hands (i.e., game outcomes).

A typical Class II bingo system poorly simulates the game play and appearance of a Class III five card draw poker game for a player using a Class II bingo game outcome as follows.

First, the Class II bingo system conducts a random bingo number draw and determines whether the game-winning pattern, one of the interim patterns, or a non-winning pattern is marked on the player's bingo card. The Class II bingo system then determines the Class III game outcome—here, a final hand of five cards—associated with that marked pattern. The player's final hand—and the game outcome—is therefore predetermined independent of any player interaction. For instance, the Class II bingo system determines that an L-shaped interim pattern, which is associated with a final hand of J⌊, J♥, J♣, A♣, and K♣ and a 15 credit interim award, is marked on the player's bingo card.

The Class II bingo system then determines an initial hand of five cards based on the predetermined final hand. The initial hand is a hand that, if played ideally, would result in the predetermined final hand. The Class II bingo system displays the initial hand to the player. Continuing with the above example, the Class II bingo system determines and displays an initial hand of J⌊, J♥, J♣, A♣, and 10♣.

The Class II bingo system then enables the player to choose which cards (if any) of the initial hand to hold. If the player chooses ideally, the Class II bingo system holds and/or discards cards to result in the display of the predetermined final hand. Continuing with the above example, if the player holds J⌊, J♥, J♣, and A♣, and the Class II bingo system replaces the discarded 10♣ with K♣, resulting the predetermined final hand of J⌊, J♥, J♣, A♣, and K♣. So if the player chooses ideally, the Class II bingo system substantially identically simulates the game play and appearance of a Class III five card draw video poker game.

But if the player does not choose ideally, the Class II bingo system must awkwardly disregard some or all of the player's choices to force the final hand to be the predetermined final hand. Continuing with the above example, assume the player wants to take a chance and try to draw for a Royal Flush—the non-ideal play—and discards J♦ and J♥. This is a problem because the player discarded two cards that must end up in the predetermined final hand. Accordingly, the Class II bingo system must force the player's final hand to match the predetermined final hand of J⌊, J♥, J♣, A♣, and K♣ by adding the discarded J♦ and J♥ back into the hand and replacing the held 10♣ with K♣. This can confuse and frustrate the player, since the player's final hand (in this instance) doesn't include one of the held cards and includes some of the discarded cards.

There is a continuing need to develop new and improved Class II wager gaming technology to provide truly interactive Class II bingo games that enable player input to affect the Class II bingo game outcomes while meeting the requirements of a Class II bingo game.

SUMMARY

The gaming system and method of the present disclosure provide a Class II bingo game with a player-selectable wild spot feature. Generally, for a play of the Class II bingo game and for each player, the gaming system provides that player a bingo card and enables the player to affirmatively designate up to a designated quantity of spots of the bingo card as wild spots. The wild spots are guaranteed marks. The gaming system then draws bingo numbers until a game-winning pattern is marked on one of the players' bingo cards.

More specifically, in one embodiment, responsive to receiving an enrollment request from a player, the gaming system enrolls the player in a play of a Class II bingo game and determines multiple bingo cards for the player. Each bingo card includes an array of a plurality of spots, and each spot includes a bingo number of a set of multiple different bingo numbers. Each spot of each of the player's bingo cards corresponds to a spot of each of the player's other bingo cards. The gaming system displays the player's bingo cards. The gaming system continues to enroll players in the play of the Class II bingo game until initiating the play of the Class II bingo game.

For the play of the Class II bingo game and for each player, the gaming system first enables that player to, if desired, select up to a designated quantity of randomly determined spots of each of the player's bingo cards to be wild spots. Specifically, for each player, the gaming system randomly determines a first quantity of the spots of a first bingo card of that player as potential wild spots. For each player, the gaming system receives, from that player, a selection of zero, one, or a plurality of that player's potential wild spots. For each player, the gaming system designates as wild spots: (1) any selected potential wild spots; and (2) any spots of the player's other bingo cards that correspond to the selected potential wild spots. The gaming system marks the wild spots on their respective bingo cards. The wild spots persist across all of the player's bingo cards and represent guaranteed marks for the play of the Class II bingo game.

After all players designate any wild spots, the gaming system conducts a bingo number draw by randomly selecting one of the bingo numbers of the set of bingo numbers. For each bingo card of each player, the gaming system marks any spot associated with the randomly selected bingo number (if not already marked via a wild spot). Afterwards, the gaming system determines whether the marked spots of any of the players' bingo cards match a game-winning pattern. If not, the gaming system conducts another bingo number draw.

But if the gaming system determines the marked spots of one of the players' bingo cards match the game-winning pattern, the gaming system provides that player a community award for the game-winning pattern. This ends the bingo number draw. The gaming system determines whether the marked spots of any of the other players' bingo cards match an interim pattern (or one of a plurality of different interim patterns). If not, the gaming system ends the play of the Class II bingo game. But if the gaming system determines that the marked spots of a player's bingo card match the interim pattern, the gaming system provides an interim award for the matched interim pattern to that player, and ends the play of the Class II bingo game Additional features and advantages are described herein, and will be apparent from, the following Detailed Description and the Figures.

BRIEF DESCRIPTION OF THE FIGURES

FIG. 2C shows four bingo cards including identically arranged spots and two marked, player-selected persistent wild spots.

FIG. 2E shows the bingo cards of FIG. 2C following several bingo number draws.

FIGS. 3A-3E illustrate screen shots of one example Class II bingo game with a player-selectable wild spot feature simulating Class III TRIPLE PLAY DRAW POKER (TRIPLE PLAY DRAW POKER is a registered trademark of IGT Corporation).

DETAILED DESCRIPTION

The gaming system and method of the present disclosure provide a Class II bingo game with a player-selectable wild spot feature. Generally, for a play of the Class II bingo game and for each player, the gaming system provides that player a bingo card and enables the player to affirmatively designate up to a designated quantity of spots of the bingo card as wild spots. The wild spots are guaranteed marks. The gaming system then draws bingo numbers until a game-winning pattern is marked on one of the players' bingo cards.

Figure 1:
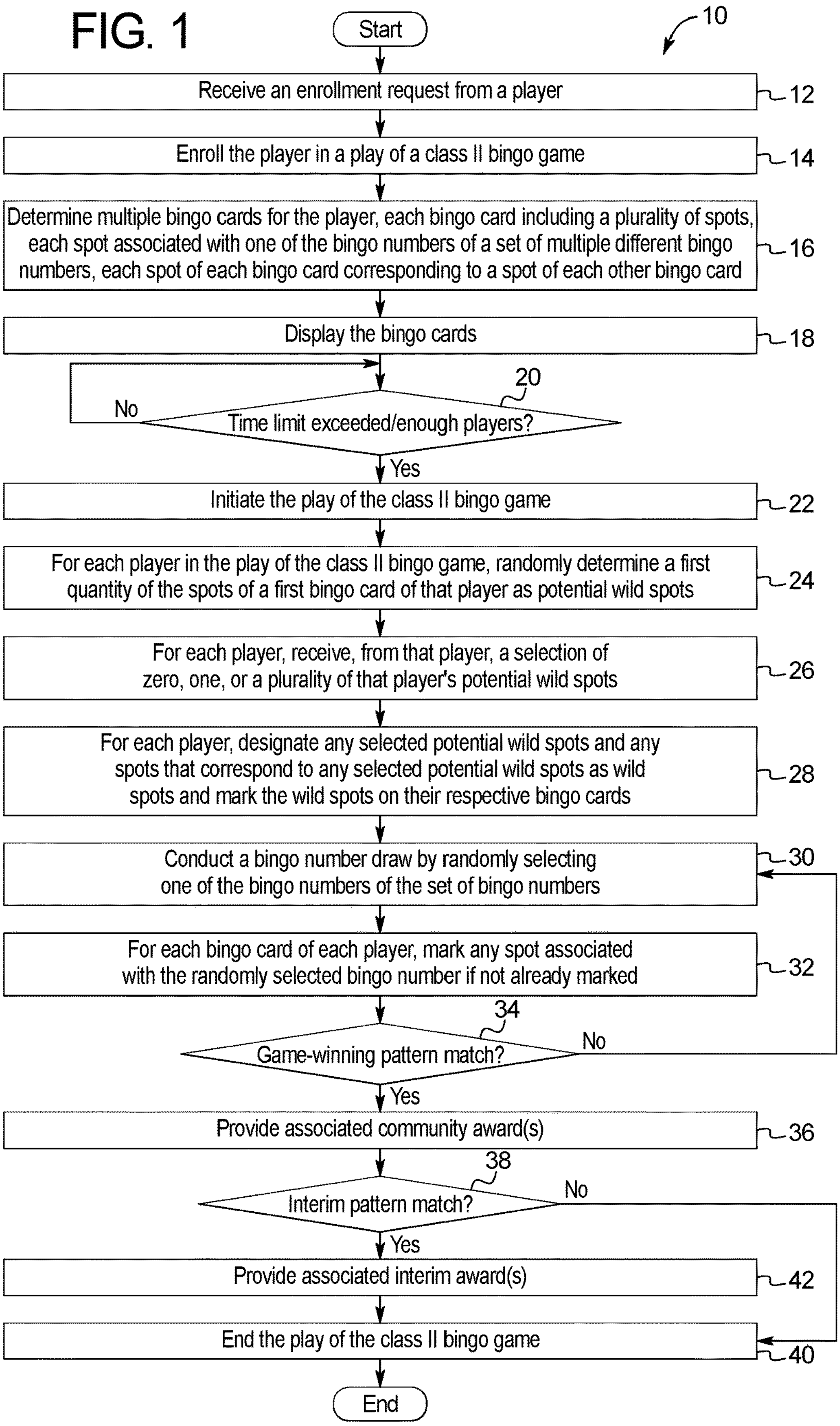
FIG. 1 is a flowchart of an example process or method of operating a gaming system of the present disclosure to provide an example Class II bingo game with a player-selectable wild spot feature.

FIG. 1 is a flowchart of an example process or method 10 of operating a gaming system of the present disclosure to provide an example Class II bingo game with a player-selectable wild spot feature. In various embodiments, a set of instructions stored in one or more memories and executed by one or more processors represents the process 10. Although the process 10 is described with reference to the flowchart shown in FIG. 1, many other processes of performing the acts associated with this process 10 may be employed. For example, the order of certain of the blocks or diamonds may be changed, certain of the blocks or diamonds may be optional, or certain of the blocks or diamonds may not be employed.

In operation of this example embodiment, the process 10 begins after the gaming system receives an enrollment request from a player who desires to enroll in a play of a Class II bingo game, as block 12 indicates. Responsive to receiving the request, the gaming system enrolls the player in the play of the Class II bingo game, as block 14 indicates. The gaming system determines multiple bingo cards for the player, as block 16 indicates, and displays those bingo cards, as block 18 indicates. Each bingo card includes an array or matrix of spots or bingo number display areas (such as a 4×13 array of spots, a 5×5 array or spots, or any other suitable array of spots). The gaming system randomly associates or maps multiple bingo numbers of a set of a plurality of different bingo numbers (such as bingo numbers 1-52 or any other suitable quantity of bingo numbers (which may have any suitable values)) to the spots such that each spot of each bingo card is associated with one of the bingo numbers of the set. Each spot of each bingo card corresponds to a spot of each other bingo card. In this example embodiment, the player's bingo cards have identical arrays, and the identically positioned spots of the bingo cards correspond to one another. In other embodiments, the bingo cards may be prepared in advance instead of responsive to a player to request to enroll in the Class II bingo game.

The gaming system determines whether to initiate the play of the Class II bingo game by determining whether: (1) a designated period of time since the first enrollment has expired; and/or (2) a minimum quantity of players has been enrolled in the play of the Class II bingo game, depending on the embodiment, as diamond 20 indicates. If neither the designated period of time has expired nor the minimum quantity of players has been enrolled in the play of the Class II bingo game, process 10 continues waiting and enrolling players. But if either the designated period of time has expired or the minimum quantity of players has been enrolled in the play of the Class II bingo game, the gaming system initiates a play of the Class II bingo game, as block 22 indicates.

For the play of the Class II bingo game and for each player, the gaming system first enables that player to, if desired, select up to a designated quantity of randomly determined spots of each of the player's bingo cards to be wild spots. Specifically, for each player, the gaming system randomly determines a first quantity of the spots of a first bingo card of that player as potential wild spots, as block 24 indicates. For each player, the gaming system receives, from that player, a selection of zero, one, or a plurality of that player's potential wild spots, as block 26 indicates. For each player, the gaming system designates as wild spots: (1) any selected potential wild spots; and (2) any spots of the player's other bingo cards that correspond to the selected potential wild spots, as block 28 indicates. The gaming system marks the wild spots on their respective bingo cards, as block 28 also indicates. The wild spots persist across all of the player's bingo cards and represent guaranteed marks for the play of the Class II bingo game.

After all players designate any wild spots, the gaming system conducts a bingo number draw by randomly selecting one of the bingo numbers of the set of bingo numbers, as block 30 indicates. For each bingo card of each player, the gaming system marks any spot associated with the randomly selected bingo number (if not already marked via a wild spot), as block 32 indicates. Afterwards, the gaming system determines whether the marked spots of any of the players' bingo cards match a game-winning pattern, as diamond 34 indicates. If not, process 10 returns to block 30, and the gaming system conducts another bingo number draw.

But if the gaming system determines at diamond 34 that the marked spots of one of the players' bingo cards match the game-winning pattern, the gaming system provides that player a community award for the game-winning pattern, as block 36 indicates. This ends the bingo number draw. The gaming system determines whether the marked spots of any of the other players' bingo cards match an interim pattern (or one of a plurality of different interim patterns), as diamond 38 indicates. If not, the gaming system ends the play of the Class II bingo game, as block 40 indicates. But if the gaming system determines at diamond 38 that the marked spots of a player's bingo card match the interim pattern, the gaming system provides an interim award for the matched interim pattern to that player, as block 42 indicates, and ends the play of the Class II bingo game, as block 40 indicates.

In other embodiments, the gaming system determines whether any interim patterns are matched following each bingo number draw rather than after the game-winning pattern has been matched. In some embodiments, a player must daub a winning pattern (e.g., within a predetermined time) to claim a prize or a spot whose bingo number has been drawn to mark that spot. In other embodiments, such as the one described above with respect to FIG. 1, the player need not daub or the gaming system automatically daubs any winning patterns or any spots whose number has been drawn.

The gaming system's operation of one example Class II bingo game with a player-selectable wild spot feature for one player of the Class II bingo game is described below in association with FIGS. 2A-2E. In this example embodiment, the gaming system has provided the player four bingo cards 100*a*, 100*b*, 100*c*, and 100*d* each including identical 4×13 arrays of spots 101*a*-152*a*, 101*b*-152*b* (not labeled), 101*c*-152*c* (not labeled), and 101*d*-152*d* (not labeled), respectively. For each bingo card 100*a*, 100*b*, 100*c*, and 100*d*, each spot of that bingo card is associated with a different bingo number of the set of bingo numbers 1-52. Identically positioned spots on the bingo cards 100*a*-100*d* correspond to one another. For instance, spots 101*a*, 101*b*, 101*c*, and 101*d* correspond to one another; spots 102*a*, 102*b*, 102*c*, and 102*d* correspond to one another; and so up on up to spots 152*a*, 152*b*, 152*c*, and 152*d*.

Figure 2A:
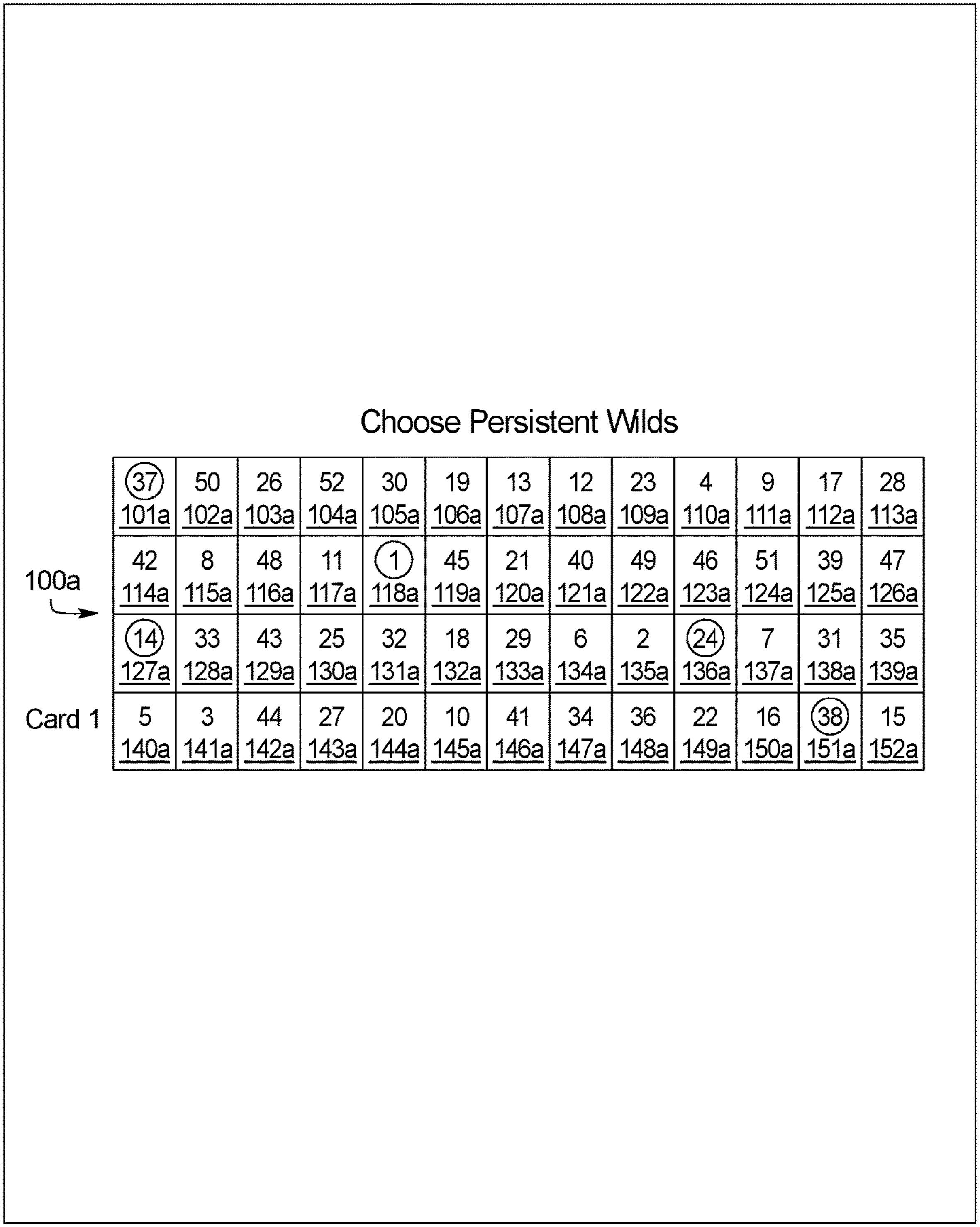
FIG. 2A shows a bingo card indicating five randomly determined potential wild spots that a player may designate as wild spots.

In this example embodiment, upon initiating a play of the Class II bingo game, for each player, the gaming system randomly selects five spots of one of the bingo cards of that player as potential wild spots, and enables that player to designate up to all of those spots as wild spots for all of that player's bingo cards. For this player, as shown in FIG. 2A, the gaming system has randomly determined the spots 101*a*, 118*a*, 127*a*, 136*a*, and 151*a* as potential wild spots. As best shown in FIG. 2C, the gaming system receives a selection of the potential wild spots 101*a* and 127*a* and designates those spots and corresponding spots 101*b* and 127*b* of the bingo card 100*b*, corresponding spots 101*c* and 127*c* of the bingo card 100*c*, and corresponding spots 101*d* and 127*d* of the bingo card 100*d* as wild spots. The gaming system marks these wild spots, and for each bingo card considers the marked wild spots the first two marks for the bingo number draw for that bingo card.

Figure 2B:
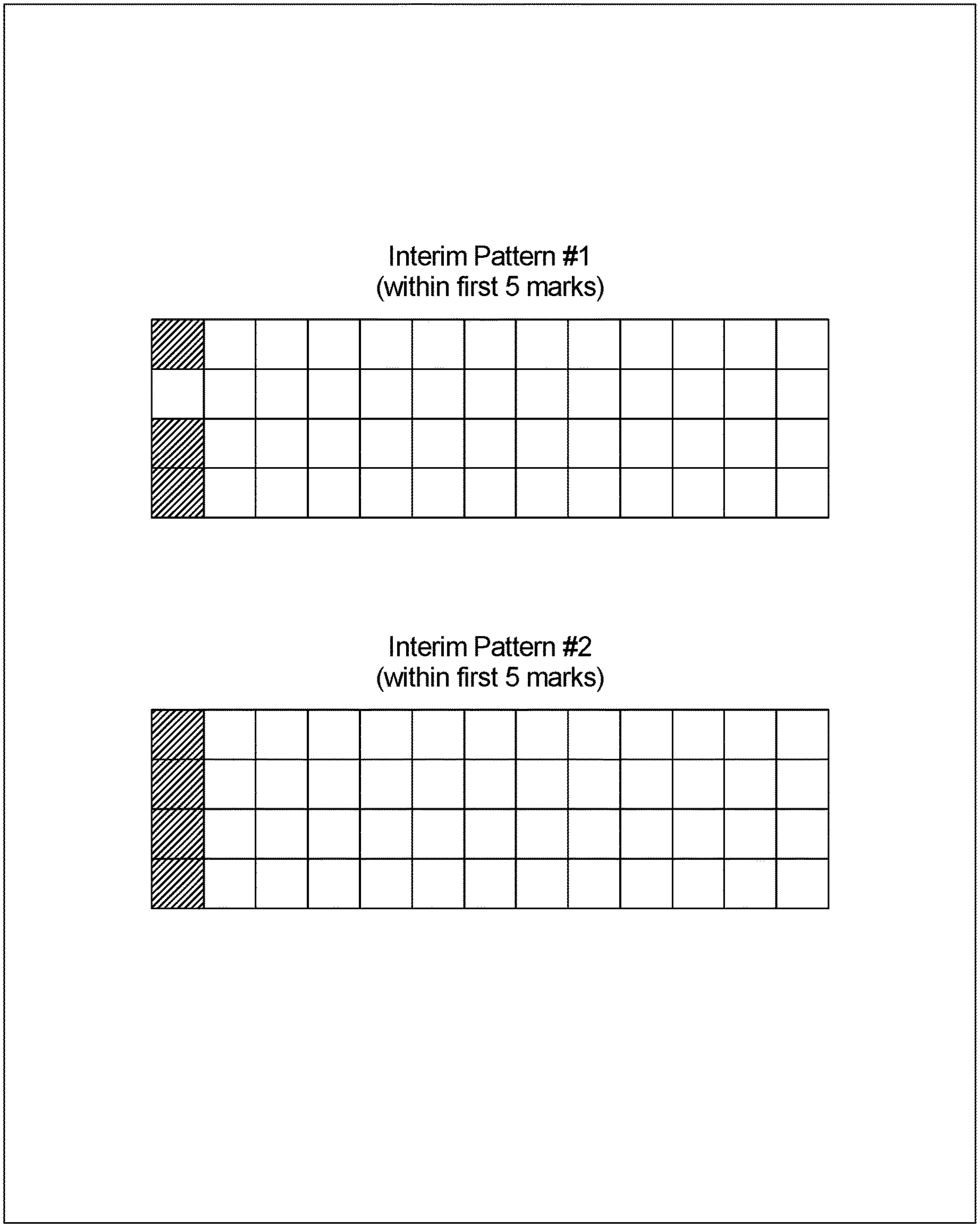
FIG. 2B shows two example interim patterns for the bingo cards of FIGS. 2A, 2C, and 2D.

The gaming system proceeds with the bingo number draw. FIG. 2B shows two example interim patterns for the bingo cards 100*a*, 100*b*, 100*c*, and 100*d* that may be matched based on the bingo number draw. In this example embodiment, Interim Pattern #1 is matched when spots 101, 127, and 140 are marked on a bingo card within the first five marks on that bingo card, and Interim Pattern #2 is matched when spots 101, 114, 127, and 140 are marked on a bingo card within the first five marks on that bingo card.

Figure 2D:
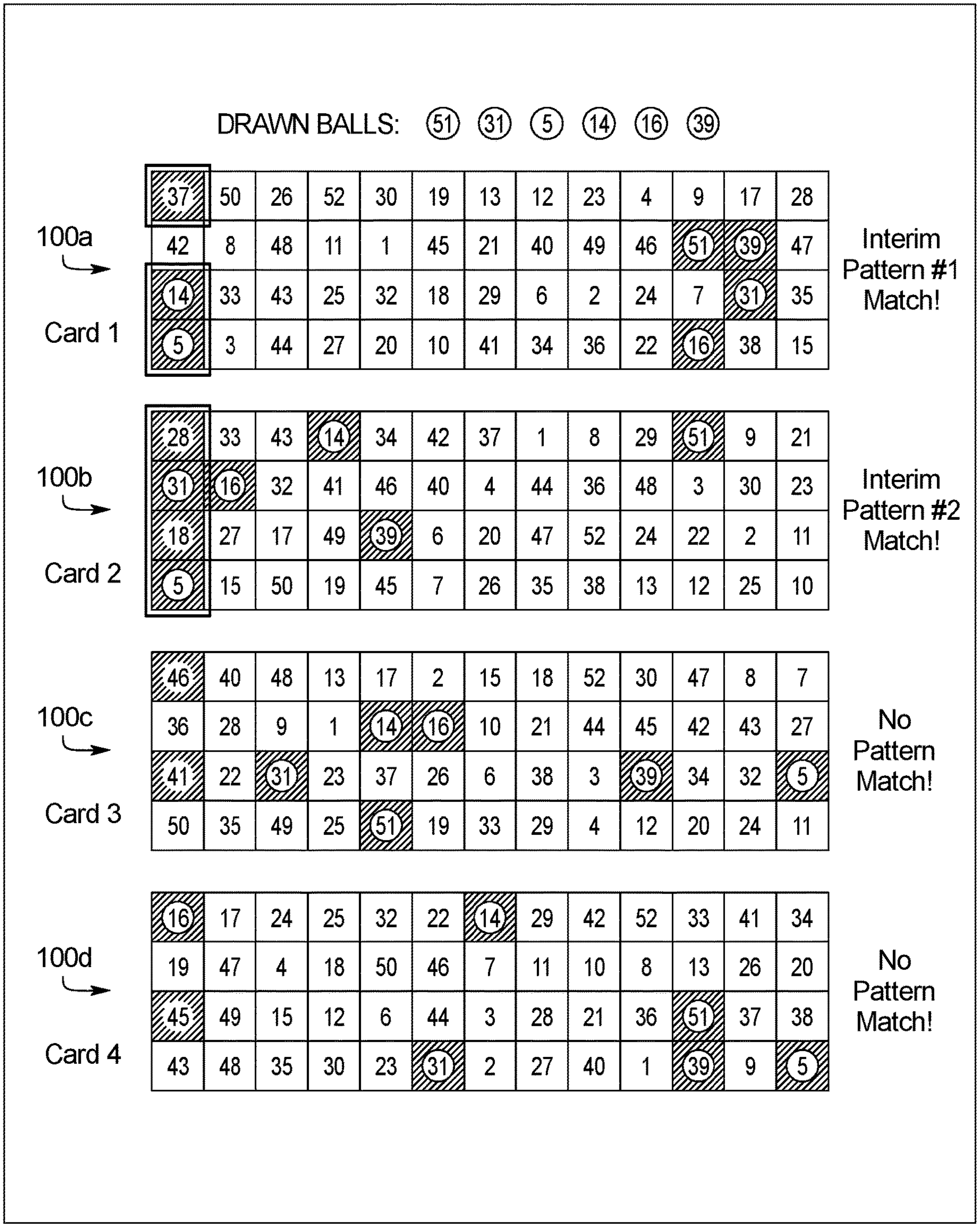
FIG. 2D shows the bingo cards of FIG. 2C following several bingo number draws.

FIG. 2D shows the bingo cards of 100*a*, 100*b*, 100*c*, and 100*d* following a draw of the following bingo numbers in the following order: 51, 31, 5, 14, 16, and 39. The gaming system marks the spots associated with the drawn bingo numbers (unless they're already marked wild spots).

For bingo card 100*a*, the gaming system marks the spots in the following order: 101*a* (wild spot), 127*a* (wild spot), 124*a* (drawn bingo number 51), 138*a* (drawn bingo number 31), 140*a* (drawn bingo number 5), 150*a* (drawn bingo number 16), and 125*a* (drawn bingo number 39). Although the gaming system drew six bingo numbers, the gaming system only marked five additional spots on the bingo card 100*a*. This happened because the wild spot 127*a* associated with the drawn bingo number 14 was already marked. Since the first five marks of bingo card 100*a* include the spots 101*a*, 127*a*, and 140*a*, the gaming system determines that Interim Pattern #1 was matched on bingo card 100*a*.

For bingo card 100*b*, the gaming system marks the spots in the following order: 101*b* (wild spot), 127*b* (wild spot), 111*b* (drawn bingo number 51), 114*b* (drawn bingo number 31), 140*b* (drawn bingo number 5), 104*b* (drawn bingo number 14), 115*b* (drawn bingo number 16), and 131*b* (drawn bingo number 39). Since the first five marks of bingo card 100*b* include the spots 101*b*, 114*b*, 127*b*, and 140*b*, the gaming system determines that Interim Pattern #2 was matched on bingo card 100*b*. In this example embodiment, Interim Pattern #1 is also matched on bingo card 100*a*, but since it's a lower priority interim pattern than Interim Pattern #2, the gaming system ignores it.

For bingo card 100*c*, the gaming system marks the spots in the following order: 101*c* (wild spot), 127*c* (wild spot), 144*c* (drawn bingo number 51), 129*c* (drawn bingo number 31), 139*c* (drawn bingo number 5), 118*c* (drawn bingo number 14), 119*c* (drawn bingo number 16), and 136*c* (drawn bingo number 39). Since the first five marks of bingo card 100*c* don't include the spots 114*c* or 140*c*, the gaming system determines that neither Interim Pattern #1 nor Interim Pattern #2 was matched on bingo card 100*c*.

For bingo card 100*d*, the gaming system marks the spots in the following order: 101*d* (wild spot), 127*d* (wild spot), 137*d* (drawn bingo number 51), 145*d* (drawn bingo number 31), 152*d* (drawn bingo number 5), 107*d* (drawn bingo number 14), and 150*d* (drawn bingo number 39). Although the gaming system drew six bingo numbers, the gaming system only marked five additional spots on the bingo card 100*d*. This happened because the wild spot 101*d* associated with the drawn bingo number 16 was already marked. Since the first five marks of bingo card 100*d* don't include the spots 114*d* or 140*d*, the gaming system determines that neither Interim Pattern #1 nor Interim Pattern #2 was matched on bingo card 100*d*.

FIG. 2E shows the bingo cards of 100*a*, 100*b*, 100*c*, and 100*d* following a draw of the following bingo numbers in the following order: 51, 31, 14, 16, 5, and 39. The gaming system marks the spots associated with the drawn bingo numbers (unless they're already marked wild spots).

For bingo card 100*a*, the gaming system marks the spots in the following order: 101*a* (wild spot), 127*a* (wild spot), 124*a* (drawn bingo number 51), 138*a* (drawn bingo number 31), 150*a* (drawn bingo number 16), 140*a* (drawn bingo number 5), and 125*a* (drawn bingo number 39). Although the gaming system drew six bingo numbers, the gaming system only marked five additional spots on the bingo card 100*a*. This happened because the wild spot 127*a* associated with the drawn bingo number 14 was already marked. Since the first five marks of bingo card 100*a* don't include the spots 114*a* or 140*a*, the gaming system determines that neither Interim Pattern #1 nor Interim Pattern #2 was matched on bingo card 100*a*.

For bingo card 100*b*, the gaming system marks the spots in the following order: 101*b* (wild spot), 127*b* (wild spot), 111*b* (drawn bingo number 51), 114*b* (drawn bingo number 31), 104*b* (drawn bingo number 14), 115*b* (drawn bingo number 16), 140*b* (drawn bingo number 5), and 131*b* (drawn bingo number 39). Since the first five marks of bingo card 100*b* don't include the spot 140*b*, the gaming system determines that neither Interim Pattern #1 nor Interim Pattern #2 was matched on bingo card 100*b*.

For bingo card 100*c*, the gaming system marks the spots in the following order: 101*c* (wild spot), 127*c* (wild spot), 144*c* (drawn bingo number 51), 129*c* (drawn bingo number 31), 118*c* (drawn bingo number 14), 119*c* (drawn bingo number 16), 139*c* (drawn bingo number 5), and 136*c* (drawn bingo number 39). Since the first five marks of bingo card 100*c* don't include the spots 114*c* or 140*c*, the gaming system determines that neither Interim Pattern #1 nor Interim Pattern #2 was matched on bingo card 100*c*.

For bingo card 100*d*, the gaming system marks the spots in the following order: 101*d* (wild spot), 127*d* (wild spot),

137*d* (drawn bingo number 51), 145*d* (drawn bingo number 31), 107*d* (drawn bingo number 14), 152*d* (drawn bingo number 5), and 150*d* (drawn bingo number 39). Although the gaming system drew six bingo numbers, the gaming system only marked five additional spots on the bingo card 100*d*. This happened because the wild spot 101*d* associated with the drawn bingo number 16 was already marked. Since the first five marks of bingo card 100*d* don't include the spots 114*d* or 140*d*, the gaming system determines that neither Interim Pattern #1 nor Interim Pattern #2 was matched on bingo card 100*d*.

One example Class II bingo game with a player-selectable wild spot feature that simulates Class III TRIPLE PLAY DRAW POKER is described below in association with FIGS. 3A-3E. In this example embodiment, the gaming system's random selection of potential wild spots for a player of the Class II bingo game simulates the initial player hand determination of Class III TRIPLE PLAY DRAW POKER for that player. Also, a player's selection of which potential wild spots to designate as wild spots for the Class II bingo game simulates that player's decision of which cards of the initial hand to hold and add to each additional hand in Class III TRIPLE PLAY DRAW POKER. Additionally, the bingo number draw for the Class II bingo game simulates, if needed and for each player of the Class II bingo game: (1) the replacement of cards discarded from the initial hand of that player with replacement cards of Class III TRIPLE PLAY DRAW POKER; and (2) the addition of cards to each additional hand of that player to complete the additional hands of Class III TRIPLE PLAY DRAW POKER.

In this example embodiment, the Class II bingo game is associated with a game-ending pattern (not shown) having five or more marks and a plurality of interim patterns (including Interim Patterns #1 and #2, the others are not shown) having between two and five marks. In this example embodiment, an interim pattern is matched on a bingo card when the spots forming that interim pattern are marked within the first five marks on that bingo card. In this example embodiment, each interim pattern represents a winning card combination in Class III TRIPLE PLAY DRAW POKER (e.g., Jacks or Better, Two Pair, Three of a Kind, Straight, Flush, Full House, Four of a Kind, Straight Flush, and Royal Flush).

Figure 3A:
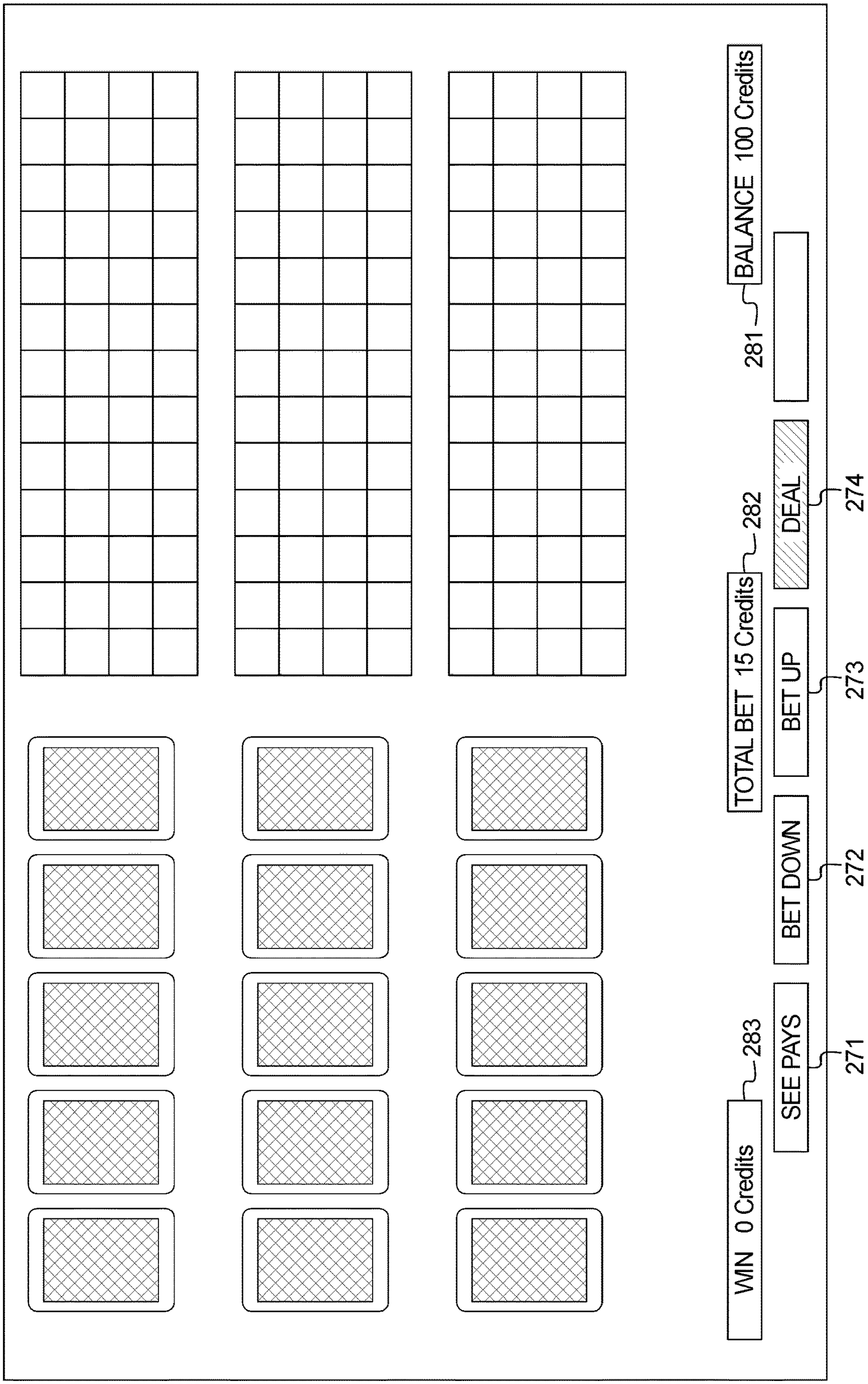
Figure 3B:
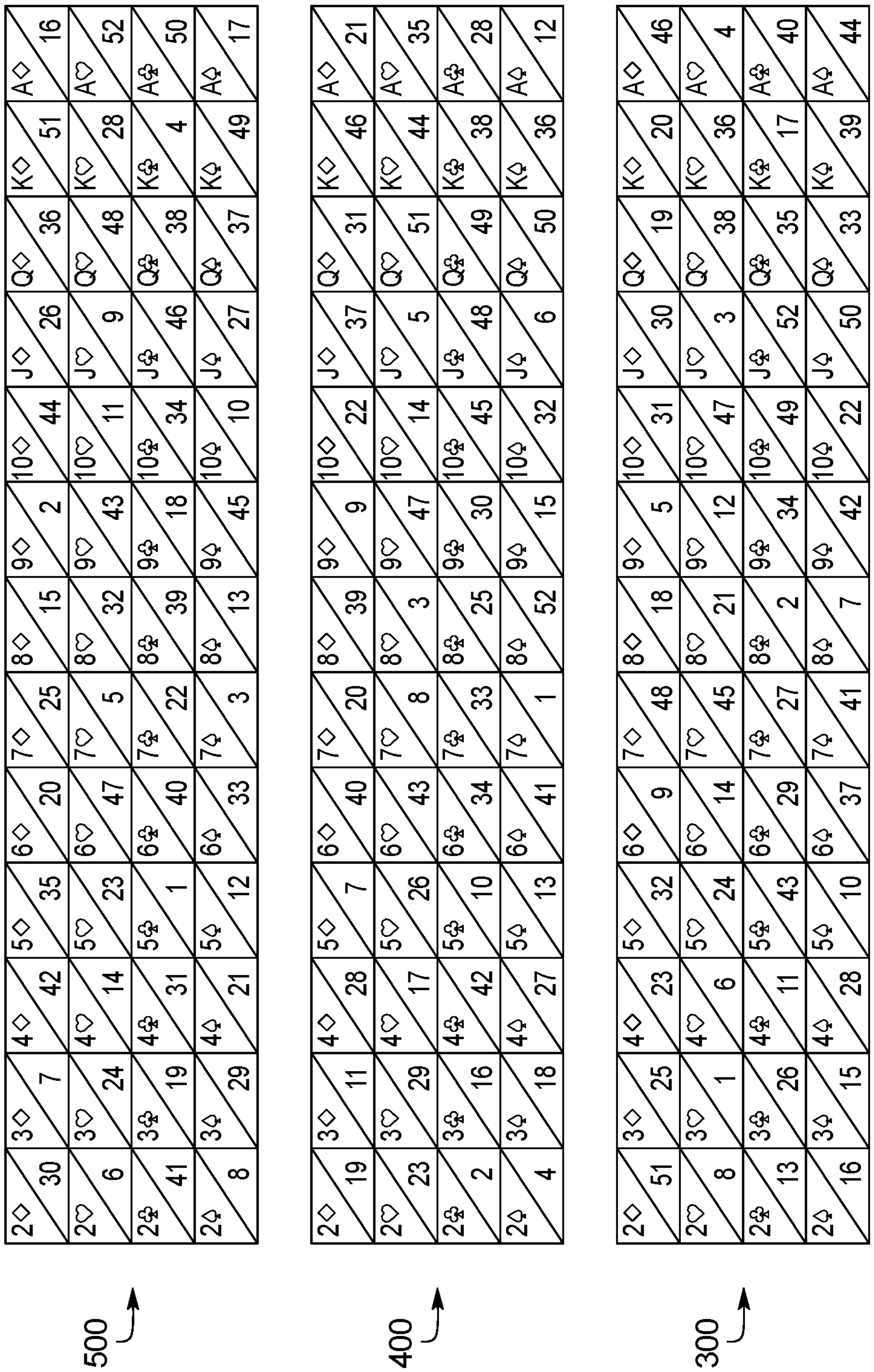
Figure 3D:
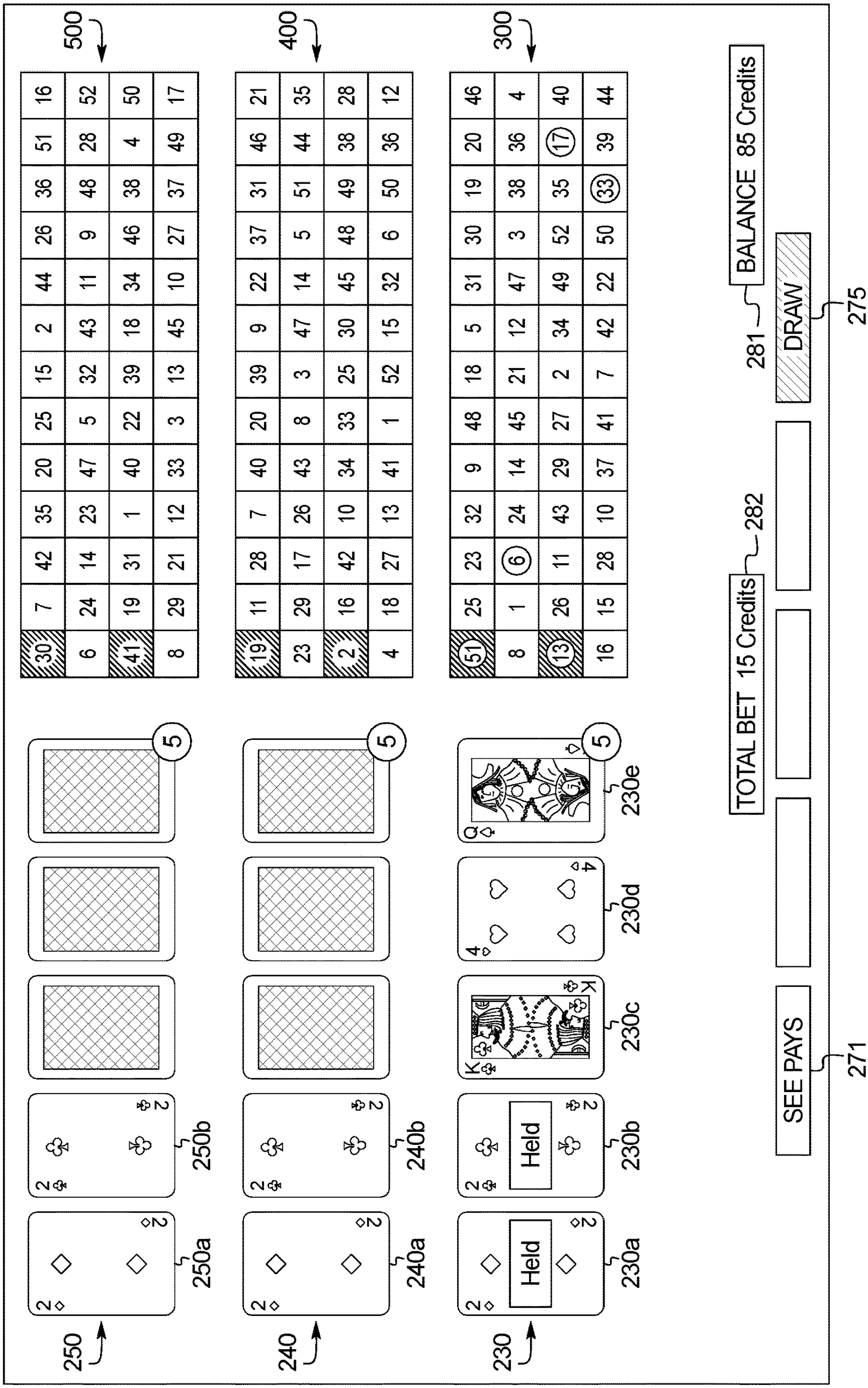
Figure 3E:
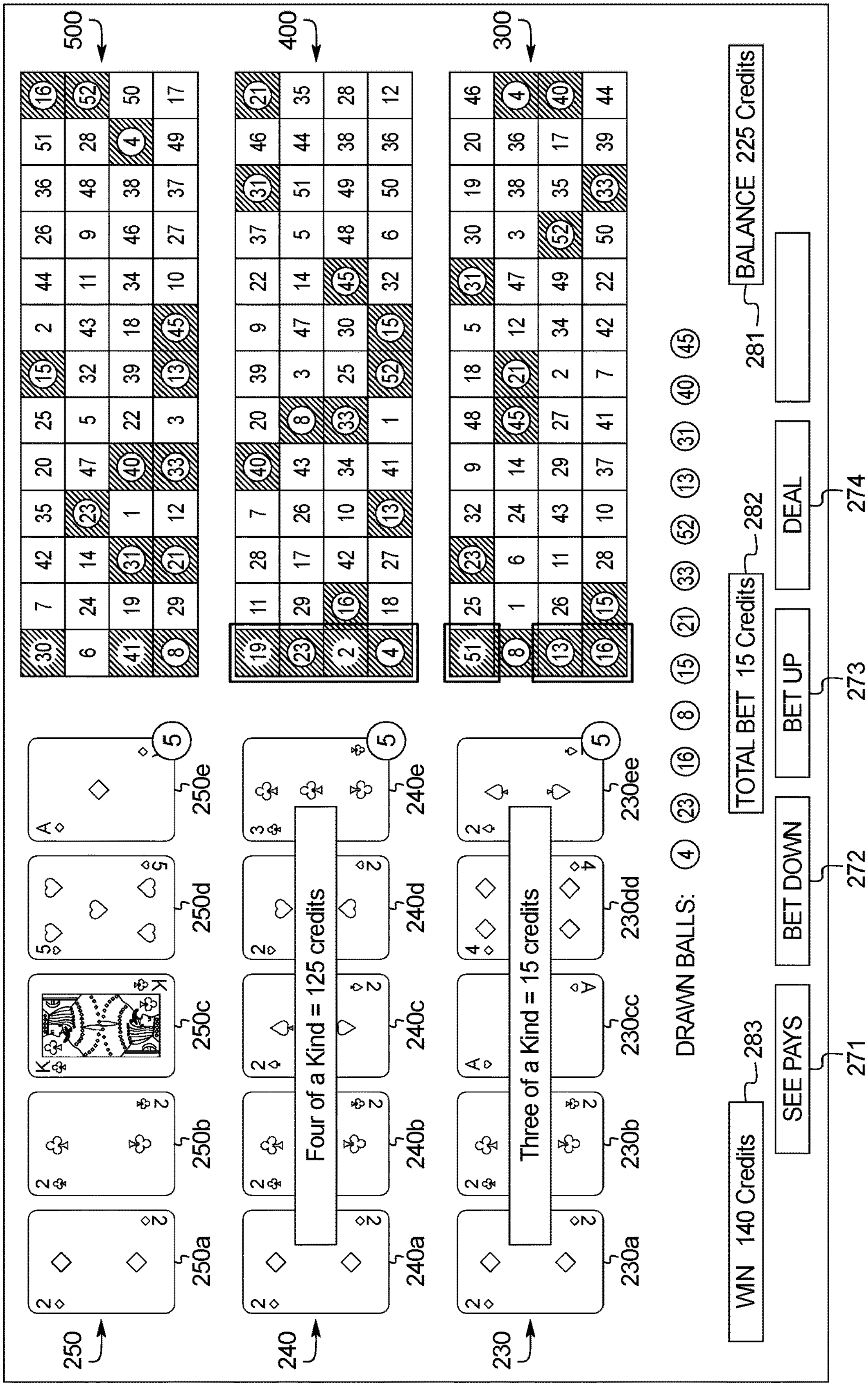
Figure 4:
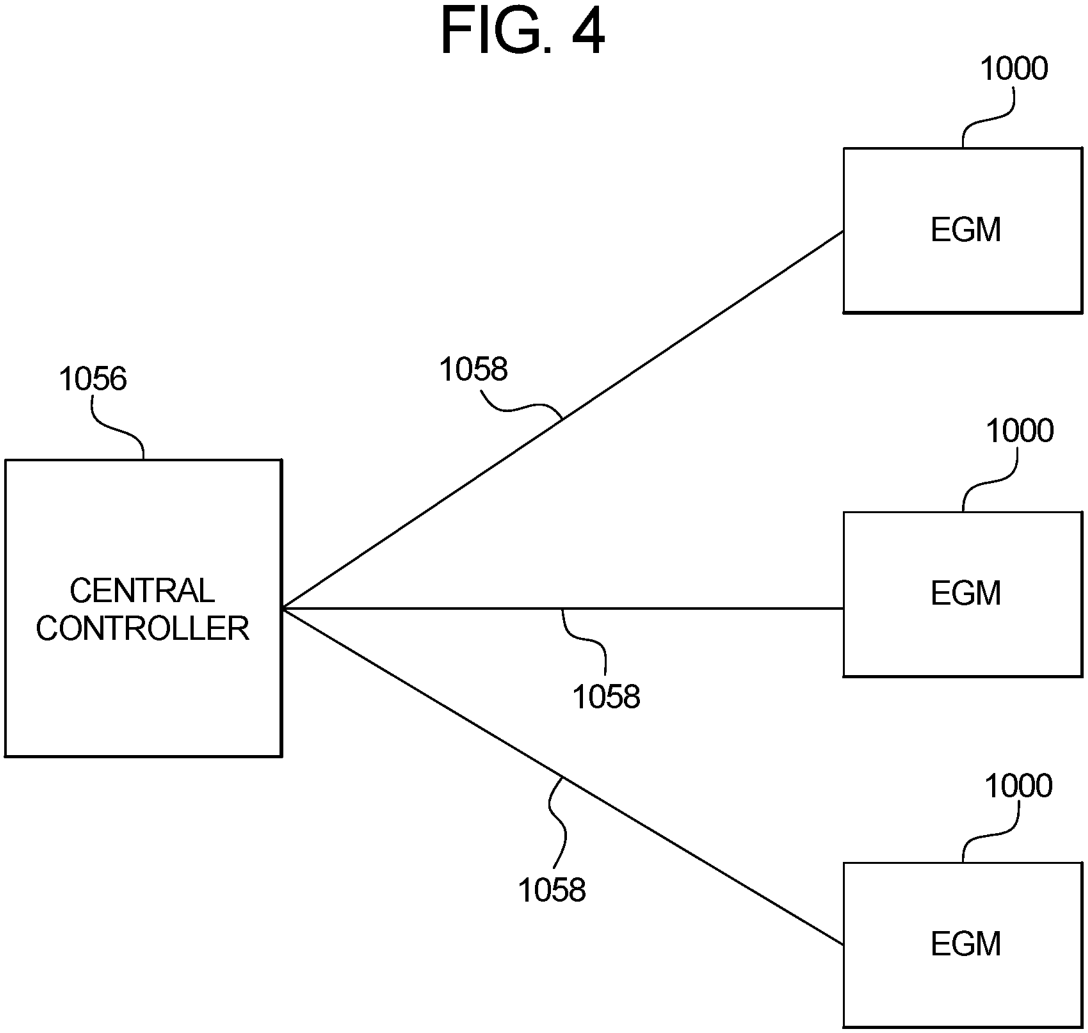
FIG. 4 is a schematic block diagram of one embodiment of a network configuration of the gaming system of the present disclosure.

As shown in FIGS. 3A, 3D, and 3E, before or during play of the Class II bingo game, at various point the gaming system displays one or more of a plurality of buttons (actuatable via a touch screen) including: (1) a SEE PAYS button 271, (2) BET DOWN button 272, (3) a BET UP button 273, (4) a DEAL button 274, and (5) a DRAW button 275. Responsive to the gaming system receiving an actuation of the SEE PAYS button 271, the gaming system displays the paytable for the Class II bingo game. Responsive to the gaming system receiving an actuation of the BET DOWN button 272, the gaming system reduces the player's wager by a predetermined amount. Responsive to the gaming system receiving an actuation of the BET UP button 273, the gaming system increases the player's wager by a predetermined amount. Responsive to the gaming system receiving an actuation of the DEAL button 274, the gaming system places a wager and enrolls the player in the Class II bingo game. Responsive to the gaming system receiving an actuation of the DRAW button 275, the gaming system completes all hands, as described below, based on the bingo number draw.

The gaming system also displays a plurality of meters including: (1) a credit meter 281 that indicates the player's credit balance, (2) a wager meter 282 that displays the player's total wager for a play of the Class II bingo game, and (3) an award meter 283 that displays any awards the player won for a play of the Class II bingo game. While in this example embodiment the gaming system indicates the player's credit balance, the player's wager, and any awards in credits, the gaming system may also indicate them in currency (e.g., U.S. dollars).

As illustrated in FIG. 3A, in this example embodiment, the gaming system receives value, such as physical currency (or its equivalent), via an acceptor. Here, the gaming system provides the player 100 credits, which represents the received value, and displays the player's credit balance of 100 credits in the credit meter 281. The gaming system receives an actuation of the DEAL button 274.

Responsive to the actuation of the DEAL button, the gaming system: (1) places a 15 credit bet on a play of the Class II bingo game and deducts the 15 credit bet from the credit balance; (2) enrolls the player in the play of the Class II bingo game; and (3) as best shown in FIGS. 3B and 3C, randomly determines three bingo cards 300, 400, and 500 for the player. To simulate Class III TRIPLE PLAY DRAW POKER, the bingo card 300 represents and is used to determine the initial hand 230, the bingo card 400 represents and is used to determine the additional hand 240, and the bingo card 500 represents and is used to determine the additional hand 350.

As best shown in FIG. 3C, the bingo cards 300, 400, and 500 each include identical 4×13 arrays of spots 301-352, 402-452, and 502-552, respectively. The identically positioned spots of the bingo cards correspond to one another: the spots 301, 401, and 501 correspond to one another; the spots 302, 402, and 502 correspond to tone another; the spots 303, 403, and 503 correspond to one another; the spots 304, 404, and 504 correspond to one another; the spots 305, 405, and 505 correspond to one another; the spots 306, 406, and 506 correspond to one another; the spots 307, 407, and 507 correspond to one another; the spots 308, 408, and 508 correspond to one another; the spots 309, 409, and 509 correspond to one another; the spots 310, 410, and 510 correspond to one another; the spots 311, 411, and 511 correspond to one another; the spots 312, 412, and 512 correspond to tone another; the spots 313, 413, and 513 correspond to one another; the spots 314, 414, and 514 correspond to one another; the spots 315, 415, and 515 correspond to one another; the spots 316, 416, and 516 correspond to one another; the spots 317, 417, and 517 correspond to one another; the spots 318, 418, and 518 correspond to one another; the spots 319, 419, and 519 correspond to one another; the spots 320, 420, and 520 correspond to one another; the spots 321, 421, and 521 correspond to one another; the spots 322, 422, and 522 correspond to tone another; the spots 323, 423, and 523 correspond to one another; the spots 324, 424, and 524 correspond to one another; the spots 325, 425, and 525 correspond to one another; the spots 326, 426, and 526 correspond to one another; the spots 327, 427, and 527 correspond to one another; the spots 328, 428, and 528 correspond to one another; the spots 329, 429, and 529 correspond to one another; the spots 330, 430, and 530 correspond to one another; the spots 331, 431, and 531 correspond to one another; the spots 332, 432, and 532 correspond to tone another; the spots 333, 433, and 533 correspond to one another; the spots 334, 434, and 534 correspond to one another; the spots 335, 435, and 535 correspond to one another; the spots 336, 436, and 536 correspond to one another; the spots 337, 437, and 537 correspond to one another; the spots 338, 438, and 538 correspond to one another; the spots 339, 439, and 539 correspond to one another; the spots 340, 440, and 540 correspond to one another; the spots 301, 401, and 501 correspond to one another; the spots 342, 442, and 542 correspond to tone another; the spots 343, 443, and 543 correspond to one another; the spots 344, 444, and 544 correspond to one another; the spots 345, 445, and 545 correspond to one another; the spots 346, 446, and 546 correspond to one another; the spots 347, 447, and 547 correspond to one another; the spots 348, 448, and 548 correspond to one another; the spots 349, 449, and 549 correspond to one another; the spots 350, 450, and 550 correspond to one another; the spots 351, 451, and 551 correspond to one another; and the spots 352, 452, and 552 correspond to one another.

As best shown in FIG. 3B, the gaming system created each bingo card 300, 400, and 500 by randomly associating each spot of that bingo card with a different one of a plurality of bingo numbers 1-52. Also, each spot of each bingo card 300, 400, and 500 is associated with a particular card of a 52 card deck of cards: spots 301-313, 401-413, and 501-513 are respectively associated with 2♦, 3♦, 4♦, 5♦, 6♦, 7♦, 8♦, 9♦, 10♦, J♦, Q♦, K♦, A♦; spots 314-326, 414-426, and 514-526 are respectively associated with 2♥, 3♥, 4♥, 5♥, 6♥, 7♥, 8♥, 9♥, 10♥, J♥, Q♥, K♥, A♥; spots 327-339, 427-439, and 527-539 are respectively associated with 2♣ , 3♣ , 4♣ , 5♣ , 6♣ , 7♣ , 8♣ , 9♣ , 10♣ , J♣ , Q♣ , K♣ , A♣ ; and spots 340-452, 440-452, and 540-552 are respectively associated with 2♠ , 3♠ , 4♠ , 5♠ , 6♠ , 7♠ , 8♠ , 9♠ , 10♠ , J ♠ , Q♠ , K♠ , A♠ . This enables the gaming system to simulate the Class III TRIPLE PLAY DRAW POKER game using the Class II bingo game outcome, as explained below.

After the gaming system determines to initiate the play of the Class II bingo game (e.g., by determining that a designated period of time since the first enrollment has expired or a minimum quantity of players has been enrolled in the play of the Class II bingo game), the gaming system first enables the player to, if desired, select up to a five randomly determined potential wild spots of each bingo card 300, 400, and 500 to be wild spots.

In this example embodiment, as shown in FIG. 3D, the gaming system randomly determines five spots 301, 316, 327, 338, and 350 as potential wild spots. These five randomly determined spots represent the five cards of the initial player hand for Class III TRIPLE PLAY DRAW POKER. Accordingly, as best shown in FIG. 3D, the gaming system displays an initial player hand 230 including 2♦230*a*, 2♣ 230*b*, K♣ 230*c*, 4♥ 230*d*, and Q♠ 230*e* that correspond to the selected spots 301, 316, 327, 338, and 350. To simulate game play of the Class III TRIPLE PLAY DRAW POKER game, the gaming system enables the player to choose none, one, or all of the potential wild spots 301, 316, 327, 338, and 350 to designate as wild spots by enabling the player to hold none, one, or all of the cards 230*a*-230*e* of the initial player hand.

In this example embodiment, the gaming system receives a selection of 2♦ 230*a* and 2♣ 230*b* from the primary hand 110 to hold, and designates the associated spots 301 (and its corresponding spots 401 and 501) and 327 (and its corresponding spots 427 and 527) as wild spots for this play of the Class II bingo game. The gaming system marks these wild spots on their respective bingo cards. The gaming system displays two incomplete additional hands 240 and 250 each including 2♦ and 2♣ , which are respectively associated with marked spots 401 and 427 and 501 and 527. The gaming system receives an actuation of the DRAW button 275.

The gaming system conducts the number draw, and randomly draws these bingo numbers in the following order: 4, 23, 16, 8, 15, 21, 33, 52, 13, 31, 40, and 45. As shown in FIG. 3E, the gaming system marks the spots associated with the drawn bingo numbers for each player's bingo card (unless they're already marked via a wild spot). Here, after drawing the bingo number 45, the gaming system determines that the marks on another player's bingo card (not shown) match a game-winning pattern (not shown).

The gaming system continues to simulate game play of Class III TRIPLE PLAY DRAW POKER using the bingo number draw by: (1) removing the cards K♣ 230*c*, 4♥ 230*d*, and Q♠ 230*e* associated with the non-selected potential wild spots 316, 338, and 350 from the initial player hand to simulate the discard step; (2) adding the cards A♥ 230*cc*, 4♦ 230*dd*, and 2♠ 230*ee* associated with the first three marked spots 326, 303, and 316 of the bingo card 300 to simulate the replacement step for the initial hand 230; (3) adding the cards 2♠ 240*c*, 2♥ 240*d*, and 3♣ 240*e* associated with the first three marked spots 440, 414, and 428 of the bingo card 400 to simulate the completion of the additional hand 240; and (4) adding the cards K♣ 250*c*, 5♥ 250*d*, and A♦ 250*e* associated with the first three marked spots 538, 517, and 513 of the bingo card 500 to simulate the completion of the additional hand 250.

The gaming system determines whether the marked spots of any of the players' bingo cards, including bingo cards 300, 400, and 500, match any of the interim patterns. The gaming system determines that the marks on the bingo card 300 match Interim Pattern #1 (and form a Three of a Kind in the initial hand 230) because the first five marks on that bingo card (spots 301, 327, 316, 303, and 340) include the spots 301, 327, and 340. The gaming system displays and provides a 15 credit interim award associated with Interim Pattern #1. The gaming system determines that the marks on the bingo card 400 match Interim Pattern #2 (and form a Four of a Kind in the additional hand 240) because the first five marks on that bingo card (spots 401, 427, 440, 414, and 428) include the spots 401, 414, 427, and 440. The gaming system displays and provides a 125 credit interim award associated with Interim Pattern #2. The gaming system determines that the marks on the bingo card 500 don't match any of the interim patterns (and form no winning card combination in additional hand 250).

In this embodiment, the gaming system conducts the bingo number draw from the entire set of bingo numbers, regardless of which spots the gaming system randomly determines to be potential wild spots. This could result in the following situation that does not exactly simulate Class III TRIPLE PLAY DRAW POKER: (1) the gaming system selecting a spot to be a potential wild spot (e.g., the spot associated with the bingo number 17 and the A♥); (2) the player not designating that spot as a wild spot; and (3) the gaming system selecting bingo number 17 during one of the first five bingo number draws, causing the gaming system to mark that spot and display the corresponding A♥ in the player's hand. In other words, the player could receive a discarded card on the draw.

To remedy this, in certain embodiments, if a player declines to designate a potential wild spot as a wild spot and the gaming system picks the bingo number of that spot during the bingo number draw, the gaming system disregards that mark. In other embodiments, if a player declines to designate a potential wild spot as a wild spot, the gaming system removes the bingo number associated with that spot from the bingo number set used in the ball draw. In one such embodiment, the gaming system conducts separate ball draws for each hand. In other embodiments, the gaming system uses the bingo number draw to select the potential wild spots. For instance, in one example embodiment, the potential wild spots are the spots associated with the first five (or any suitable quantity) drawn bingo numbers. After the player(s) select which potential wild spots the player desires to be wild (if any), the gaming system continues the bingo number draw.

In the embodiments described above with respect to FIGS. 1-3E, the gaming system determines which spots will be wild spots for a player by: (1) randomly determining a first quantity of spots on a first bingo card of the player as potential wild spots; and (2) receiving a selection from the player of zero, one, or more than one of the first quantity of potential wild spots to designate as wild spots.

In other embodiments, the gaming system determines which spots will be wild spots for a player by: (1) displaying a plurality of selections to the player, each selection associated with a different spot of a first bingo card of the player; (2) receiving a pick of a first quantity of the selections; (3) determining the spots associated with the picked selections to be potential wild spots; and (4) receiving a selection from the player of zero, one, or more than one of the potential wild spots to be wild spots.

In other embodiments, the gaming system determines which spots will be wild spots for a player by: (1) randomly determining a first quantity of bingo numbers before the bingo number draw; (2) receiving a selection from the player of zero, one, or more than one of the bingo numbers; and (3) placing the selected bingo numbers at the beginning of the bingo number draw, which means the spots associated with the numbers of the selected bingo numbers are guaranteed marks. In some embodiments, the gaming system removes the unselected bingo numbers of the first quantity of bingo numbers from the set of bingo numbers from which gaming system conducts the bingo number draw.

In the embodiments described above with respect to FIGS. 1-3E, the gaming system determines which spots will be wild spots for a player by: (1) randomly determining a first quantity of spots on a first bingo card of the player as potential wild spots; and (2) automatically determining which spots (if any) of the potential wild spots select to be wild spots in a manner that is statistically the most favorable to the player.

The Class II bingo game with player-selectable wild spot feature may be used to simulate any suitable Class III game involving player interaction. For instance, the potential wild spots that the gaming system selects—and from which the player picks to designate as wild spots—may be mapped to any suitable game play element, such as particular reels (e.g., simulating the player choosing which of a plurality of reels to hold for a spin) or particular displayed symbols (e.g., simulating the player choosing which of a plurality of symbols to hold for a spin). In some embodiments, the gaming system selects additional wild spots based on the player's selected wild spots, such as to simulate expanding wild symbols expanding on a reel or a payline.

Although the above-described examples focus on embodiments in which the gaming system provides each player of the Class II bingo game multiple bingo cards, the present disclosure contemplates embodiments in which the gaming system provides each player of the Class II bingo game with a single bingo card.

In certain embodiments, each bingo card has one of multiple different ranks or characteristics. The bingo cards of a particular rank or characteristic are associated with the same winnable award(s). The winnable award(s) may be the same across ranks, different across ranks, or partially the same across ranks. For instance, if a player has two bingo cards of different ranks, the payer is competing for awards from two different sets of awards (one for each differently ranked bingo card).

Although the above-described examples focus on Class II bingo games, the present disclosure contemplates embodiments in which the persistent wild bingo feature is employed on any suitable bingo game, including those without the Class II designation.

The present disclosure contemplates that:

(a) the quantity of bingo cards per player in the Class II bingo game;
(b) the quantity of spots in each bingo card;
(c) the arrangement of spots in each bingo card;
(d) the bingo card from which the gaming system selects the potential wild spot(s);
(e) the quantity of potential wild spots;
(f) which spots are picked as potential wild spots;
(g) how the spots of one bingo card correspond to the spots of another bingo card; and/or
(h) any other variables or determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; or (26) determined in any other suitable manner or based on or independent of any other suitable factor(s).

The above-described embodiments of the present disclosure may be implemented in accordance with or in conjunction with one or more of a variety of different types of gaming systems, such as, but not limited to, one or more of those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 3 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 5:
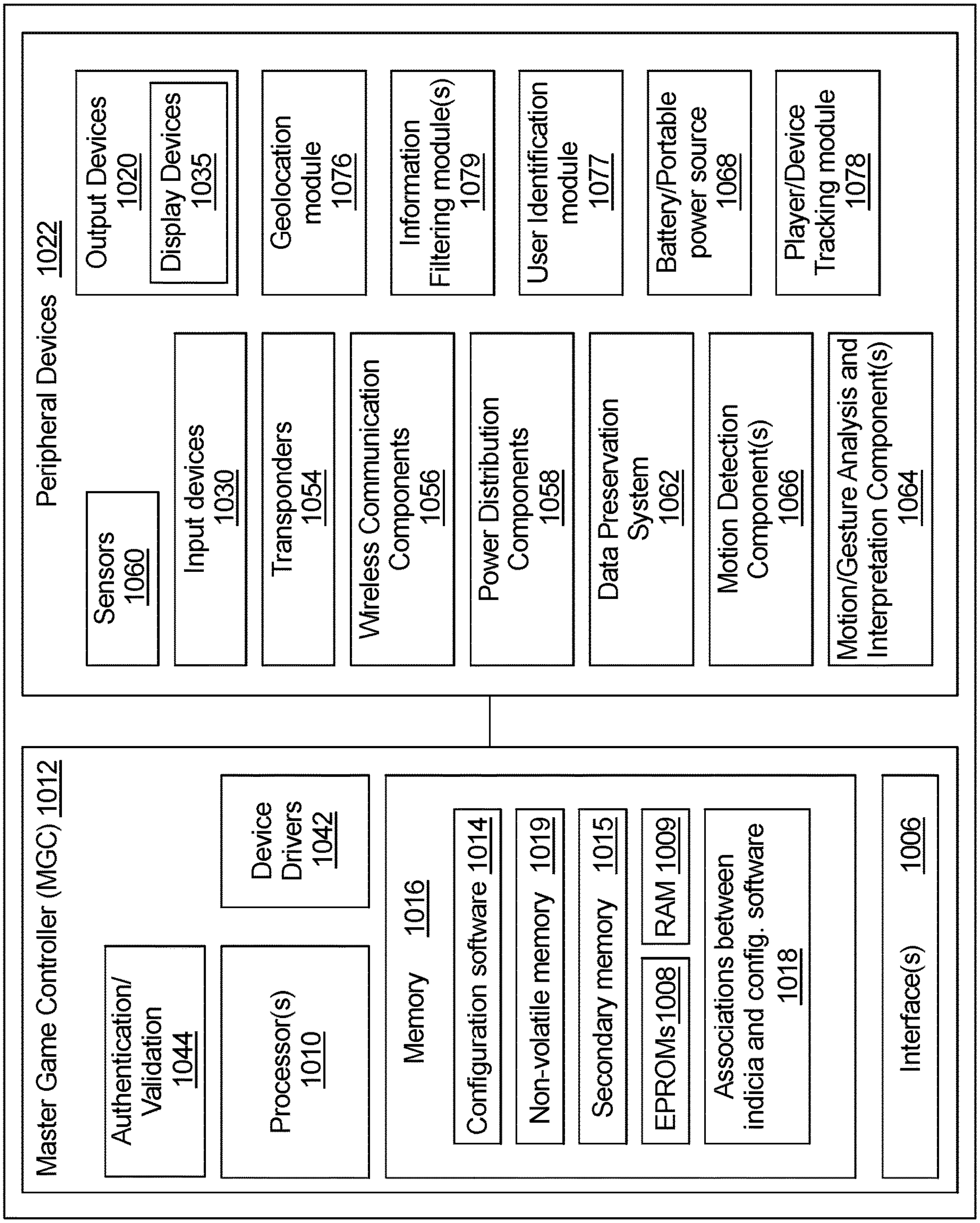
FIG. 5 is a schematic block diagram of an example electronic configuration of the gaming system of the present disclosure.
Figure 6A:
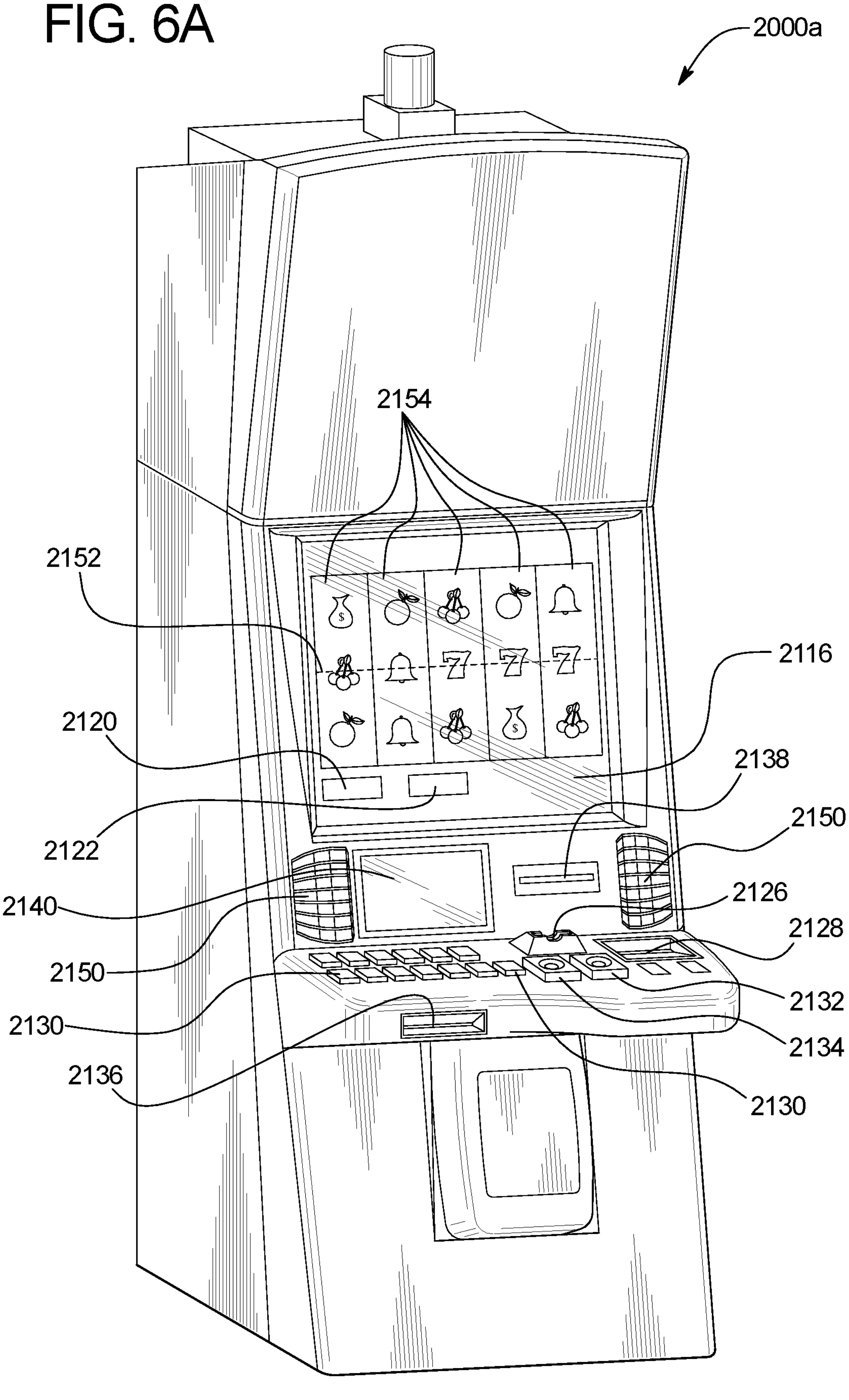
FIGS. 6A and 6B are perspective views of example alternative embodiments of the gaming system of the present disclosure.
Figure 6B:
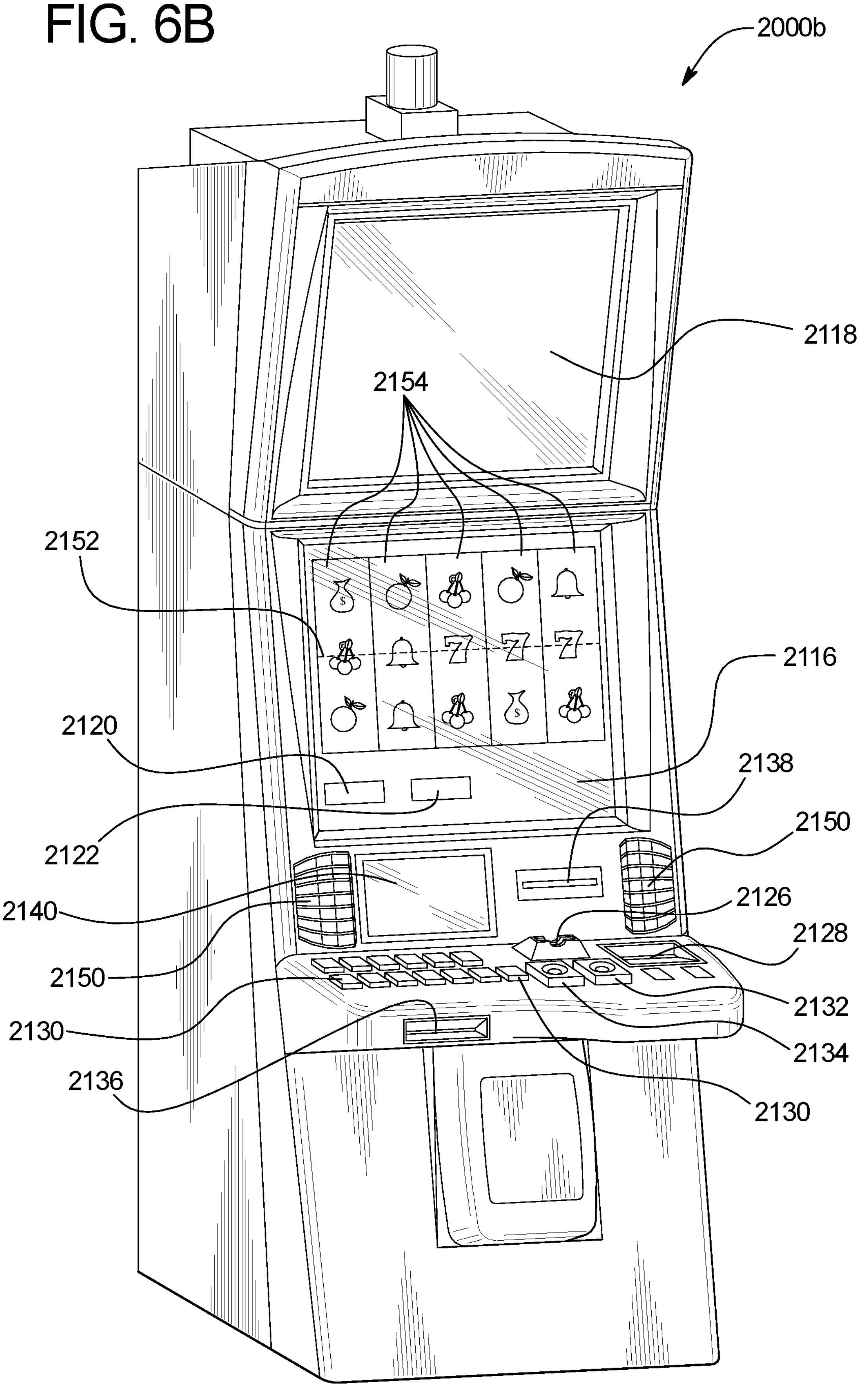

FIG. 5 is a block diagram of an example EGM 1000 and FIGS. 6A and 6B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 6A includes a central display device 2116, a player tracking display 2140, a credit display 2120, and a bet display 2122. The example EGM 2000*b* illustrated in FIG. 6B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 6A and 6B each include a ticket printer and dispenser 2136. Examples of ticket-in ticket-out (TITO) technology are described in U.S. Pat. Nos. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 6A and 6B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs **2000*a* and 2000*b* illustrated in FIGS. 6A and 6B each include a combined bill and ticket acceptor 2128 and a coin slot 2126**.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled “Avatar as Security Measure for Mobile Device Use with Electronic Gaming Machine,” which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs **2000*a* and 2000*b* illustrated in FIGS. 6A and 6B each include a game play activation device in the form of a game play initiation button 2132**. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player’s credit balance. The example EGMs **2000*a* and 2000*b* illustrated in FIGS. 6A and 6B each include a cashout device in the form of a cashout button 2134**.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs **2000*a* and 2000*b* illustrated in FIGS. 6A and 6B each include a plurality of such buttons 2130**.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs **2000*a* and 2000*b* illustrated in FIGS. 6A and 6B each include a card reader 2138**. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 6A and 6B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 6A and 6B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. Nos. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. Nos. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. Nos. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 6B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. Nos. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. Nos. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. Nos. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled “High Performance Battery Backed RAM Interface”; U.S. Pat. No. 6,863,608, entitled “Frame Capture of Actual Game Play”; U.S. Pat. No. 7,111,141, entitled “Dynamic NV-RAM”; and U.S. Pat. No. 7,384,339, entitled, “Frame Capture of Actual Game Play,” which are incorporated herein by reference.

Another feature of EGMs is that they often include unique interfaces, including serial interfaces, to connect to specific subsystems internal and external to the EGM. The serial devices may have electrical interface requirements that differ from the “standard” EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT’s Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled “Process Verification,” which is incorporated herein by reference.

In at least one embodiment, at least a portion of the trusted memory devices/sources may correspond to memory that cannot easily be altered (e.g., “unalterable memory”) such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other’s identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled “Secured Virtual Network in a Gaming Environment,” which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled “Method of Authenticating Game Data Sets in an Electronic Casino Gaming System,” which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A Class II bingo system comprising:

a processor; and a memory device that stores a plurality of instructions that, when executed by the processor, cause the processor to:

determine a first Class II bingo card comprising a plurality of first bingo card spots, wherein each of the first bingo card spots is associated with a different bingo number of a pool of bingo numbers, and each of the first bingo card spots is associated with a different playing card of a simulated Class III card game associated with the first Class II bingo card, randomly determine at least two of the first bingo card spots of the first Class II bingo card as potential wild spots, independent of the determination of the first Class II bingo card, determine a second Class II bingo card comprising a plurality of second bingo card spots, wherein each of the second bingo card spots is associated with a different bingo number of the pool of bingo numbers, each of the second bingo card spots is associated with a different playing card of the simulated Class III card game, each of the second bingo card spots of the second Class II bingo card corresponds to one of the first bingo card spots of the first Class II bingo card, and when the second Class II bingo card is determined, none of the second bingo card spots of the second Class II bingo card are potential wild spots, for each of any of the potential wild spots associated with any user held playing cards for the simulated Class III card game:

designate that potential wild spot as a wild spot, cause a display, by a display device, of a marking of that designated wild spot of the first Class II bingo card, designate the second bingo card spot of the second Class II bingo card that corresponds to that designated wild spot of the first Class II bingo card as a wild spot, and cause a display, by the display device, of a marking of the second bingo card spot of the second Class II bingo card that corresponds to that designated wild spot of the first Class II bingo card, cause a display, by the display device, of a graphical user interface comprising a graphical depiction of a discarding of any playing cards of an initial hand of the simulated Class III card game that are not the user held playing cards for the simulated Class III card game, and for each of any of the potential wild spots not associated with any user held playing cards for the simulated Class III card game, remove any bingo numbers associated with the playing card associated with that potential wild spot from the pool of bingo numbers for bingo number draws from the pool of bingo numbers.

2. The Class II bingo system of claim 1, wherein the memory device stores a plurality of further instructions that, when executed by the processor, cause the processor to determine a third Class II bingo card comprising a plurality of third bingo card spots, wherein each of the third bingo card spots is associated with a different bingo number of the pool of bingo numbers, each of the third bingo card spots is associated with a different playing card of the simulated Class III card game, each of the third bingo card spots of the third Class II bingo card corresponds to one of the first bingo card spots of the first Class II bingo card and when the third Class II bingo card is determined, none of the third bingo card spots of the third Class II bingo card are potential wild spots.

3. The Class II bingo system of claim 2, wherein the memory device stores a plurality of further instructions that, when executed by the processor, cause the processor to, for each of any of the potential wild spots of the first Class II bingo card designated as a wild spot:

designate the third bingo card spot of the third Class II bingo card that corresponds to that designated wild spot as a wild spot, cause a display, by the display device, of a marking of the third bingo card spot of the third Class II bingo card that corresponds to that designated wild spot.

4. The Class II bingo system of claim 1, wherein the memory device stores a plurality of further instructions that, when executed by the processor responsive to the marked spots of one of any of the Class II bingo cards forming an interim pattern, cause the processor to determine an interim award.

5. The Class II bingo system of claim 4, wherein the interim pattern is formable with the marked spots of the Class II bingo card within a designated quantity of marks of the Class II bingo card.

6. The Class II bingo system of claim 5, wherein the memory device stores a plurality of further instructions that, when executed by the processor, cause the processor to randomly determine a quantity of the first bingo card spots of the first Class II bingo card as the potential wild spots.

7. The Class II bingo system of claim 1, wherein the memory device stores a plurality of further instructions that, when executed by the processor, cause the processor to determine any award associated with each Class II bingo card.

8. The Class II bingo system of claim 1, wherein the user held playing cards are based on a graphical depiction of the initial hand of the simulated Class III card game comprising the playing cards associated with the potential wild spots and which of the playing cards to hold in association with the simulated Class III card game.

9. A method of operating a Class II bingo system, the method comprising:

determining, by a processor, a first Class II bingo card comprising a plurality of first bingo card spots, wherein each of the first bingo card spots is associated with a different bingo number of a pool of bingo numbers, and each of the first bingo card spots is associated with a different playing card of a simulated Class III card game associated with the first Class II bingo card, randomly determining, by the processor, at least two of the first bingo card spots of the first Class II bingo card as potential wild spots, independent of the determination of the first Class II bingo card, determining, by the processor, a second Class II bingo card comprising a plurality of second bingo card spots, wherein each of the second bingo card spots is associated with a different bingo number of the pool of bingo numbers, each of the second bingo card spots is associated with a different playing card of the simulated Class III card game, each of the second bingo card spots of the second Class II bingo card corresponds to one of the first bingo card spots of the first Class II bingo card, and when the second Class II bingo card is determined, none of the second bingo card spots of the second Class II bingo card are potential wild spots, and for each of any of the potential wild spots associated with any user held playing cards for the simulated Class III card game:

designating, by the processor, that potential wild spot as a wild spot, displaying, by a display device, a marking of that designated wild spot of the first Class II bingo card, designating, by the processor, the second bingo card spot of the second Class II bingo card that corresponds to that designated wild spot of the first Class II bingo card as a wild spot, and displaying, by the display device, a marking of the second bingo card spot of the second Class II bingo card that corresponds to that designated wild spot of the first Class II bingo card, displaying, by the display device, a graphical user interface comprising a graphical depiction of a discarding of any playing cards of an initial hand of the simulated Class III card game that are not the user held playing cards for the simulated Class III card game, and for each of any of the potential wild spots not associated with any user held playing cards for the simulated Class III card game, removing, by the processor, any bingo numbers associated with the playing card associated with that potential wild spot from the pool of bingo numbers for bingo number draws from the pool of bingo numbers.

10. The method of claim 9, further comprising, determining, by the processor, a third Class II bingo card comprising a plurality of third bingo card spots, wherein each of the third bingo card spots is associated with a different bingo number of the pool of bingo numbers, each of the third bingo card spots is associated with a different playing card of the simulated Class III card game, each of the third bingo card spots of the third Class II bingo card corresponds to one of the first bingo card spots of the first Class II bingo card, and when the third Class II bingo card is determined, none of the third bingo card spots of the third Class II bingo card are potential wild spots.

11. The method of claim 10, further comprising, for each of any of the potential wild spots of the first Class II bingo card designated as a wild spot:

designate the third bingo card spot of the third Class II bingo card that corresponds to that designated wild spot as a wild spot, and displaying, by the display device, a marking of the third bingo card spot of the third Class II bingo card that corresponds to that designated wild spot.

12. The method of claim 9, further comprising, responsive to the marked spots of one of any of the Class II bingo cards forming an interim pattern, determining, by the processor, an interim award.

13. The method of claim 12, wherein the interim pattern is formable with the marked spots of the Class II bingo card within a designated quantity of marks of the Class II bingo card.

14. The method of claim 13, further comprising randomly determining, by the processor, a quantity of the first bingo card spots of the first Class II bingo card as the potential wild spots.

15. The method of claim 9, further comprising determining, by the processor, any award associated with each Class II bingo card.

16. The method of claim 9, wherein the user held playing cards are based on a graphical depiction of the initial hand of the simulated Class III card game comprising the playing cards associated with the potential wild spots and which of the playing cards to hold in association with the simulated Class III card game.

* * * * *